United States Patent
Jun et al.

(10) Patent No.: US 9,727,978 B2
(45) Date of Patent: Aug. 8, 2017

(54) METHOD FOR EXTRACTING OUTER SPACE FEATURE INFORMATION FROM SPATIAL GEOMETRIC DATA

(71) Applicant: Korea University Research and Business Foundation, Seoul (KR)

(72) Inventors: Chang Hyun Jun, Seoul (KR); Nakju Lett Doh, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 64 days.

(21) Appl. No.: 14/848,478

(22) Filed: Sep. 9, 2015

(65) Prior Publication Data

US 2016/0328862 A1   Nov. 10, 2016

(30) Foreign Application Priority Data

May 6, 2015   (KR) ........................ 10-2015-0062890

(51) Int. Cl.
*G06K 9/00*   (2006.01)
*G06T 7/60*   (2017.01)
(Continued)

(52) U.S. Cl.
CPC ............ *G06T 7/60* (2013.01); *G05D 1/0246* (2013.01); *G06K 9/6201* (2013.01); *G06T 7/10* (2017.01);
(Continued)

(58) Field of Classification Search
CPC ... G06T 7/60–7/68; G06T 2207/20021; G06T 2207/20112; G06T 2207/10028;
(Continued)

(56) References Cited

U.S. PATENT DOCUMENTS 5,988,862 A * 11/1999 Kacyra ............... G01B 11/002
                                                         382/195
7,397,473 B2 * 7/2008 Chakraborty ..... G06F 17/30259
                                                         345/419
(Continued)

FOREIGN PATENT DOCUMENTS

JP       2010165352 A    7/2010
KR    20140013172 A    2/2014

OTHER PUBLICATIONS

Kyriazis et al., "Building Editable Free-Form Models from Unstructured Point Clouds", Computer-Aided Design & Applications (2013).*

(Continued)

*Primary Examiner* — Aaron W Carter
(74) *Attorney, Agent, or Firm* — Fox Rothschild LLP

(57) ABSTRACT

A method is provided for extracting outer space feature information from spatial geometric data. The method comprises: an input step S10 of inputting spatial geometric data for a target region; a sampling step S20 of determining a sample by selecting an arbitrary area for the spatial geometric data input in the input step using a preset selection method; a feature extraction step S30 of acquiring feature information for a corresponding sampling plane using a convex hull method based on sampling information including sampling plane information of the spatial geometric data for a sampling plane selected in the sampling step. The sampling step and the feature extraction step are repeatedly performed in a preset manner.

14 Claims, 24 Drawing Sheets

(51) Int. Cl.
*G05D 1/02* (2006.01)
*G06K 9/62* (2006.01)
*G06T 7/70* (2017.01)
*G06T 7/10* (2017.01)

(52) U.S. Cl.
CPC ...... *G06T 7/70* (2017.01); *G06T 2207/10028* (2013.01); *G06T 2207/20021* (2013.01); *G06T 2207/20112* (2013.01); *Y10S 901/01* (2013.01)

(58) Field of Classification Search
CPC ... G05D 1/0246; G06K 9/6201; Y10S 901/01
See application file for complete search history.

(56) References Cited

U.S. PATENT DOCUMENTS

| | | | | |
|---|---|---|---|---|
| 2004/0205038 | A1* | 10/2004 | Lee | G06K 9/342 706/47 |
| 2005/0253841 | A1* | 11/2005 | Brabec | G06T 15/04 345/419 |
| 2006/0262857 | A1* | 11/2006 | Iwasaki | G06T 7/20 375/240.19 |
| 2010/0001998 | A1* | 1/2010 | Mandella | G01B 11/002 345/419 |
| 2011/0205338 | A1* | 8/2011 | Choi | G06T 7/0044 348/46 |
| 2012/0038549 | A1* | 2/2012 | Mandella | G06F 3/03545 345/156 |
| 2013/0182114 | A1* | 7/2013 | Zhang | H04N 7/18 348/150 |
| 2013/0194418 | A1* | 8/2013 | Gonzalez-Banos | G01C 11/02 348/135 |
| 2014/0267248 | A1* | 9/2014 | Zou | G06T 15/60 345/420 |
| 2015/0314443 | A1* | 11/2015 | Yu | G06T 7/0042 701/28 |
| 2016/0098095 | A1* | 4/2016 | Gonzalez-Banos | G06F 3/017 345/156 |
| 2016/0299929 | A1* | 10/2016 | Park | G06F 17/30424 |
| 2016/0379370 | A1* | 12/2016 | Nakazato | G06T 7/0046 382/103 |

OTHER PUBLICATIONS

Jun et al., "Convex Cut: A Realtime Pseudo-Structure Extraction Algorithm for 3D Point Cloud Data", IEEE, Sep. 28-Oct. 2, 2015.*
Kang et al., "Performance Comparison of Polygonalization for 3D Geometric SLAM," The KSPE 2011 Spring Conference (Oct. 26, 2011—Gyeongju, Korea); pp. 223-224.
Nam et al., "A New Observation Model to Improve the Consistencey of EKF-SLAM Algorithm in Large-scale Environments," The Journal of Korea Robotics Society (2012); 7(1):29-34.

* cited by examiner

METHOD FOR EXTRACTING OUTER SPACE FEATURE INFORMATION FROM SPATIAL GEOMETRIC DATA

CROSS-REFERENCE TO RELATED APPLICATIONS

This application claims the benefit of Korean Patent Application No. 10-2015-0062890, filed on May 6, 2015 in the Korean Intellectual Property Office, which is incorporated herein by reference in its entirety.

BACKGROUND OF THE INVENTION

1. Field of the Invention

The present invention relates to a technology which is required to obtain feature information from spatial geometric data of a target region.

2. Description of Related Art

In the past, the demand was concentrated on industrial stationary robots. On the contrary, in recent years, research on mobile robots is actively in progress along with an increase in the demand for the household robot market.

A variety of research is being conducted on the improvement of the performance of the mobile robots. One of core technologies of this research is exemplified by a technology of finding a feature in a space. For example, the finding of a feature in a surrounding space is indispensable in order for a robot to move around or recognize an object in a real life. To this end, a proper feature is required to be extracted from data observed from various items of sensor information.

In particular, several environmental factors should be taken into consideration in a space where people do activities unlike a factory where industrial stationary robots are present. Typically, unlike an outdoor environment, an indoor space can be classified into the following three factors: (1) structure, (2) object, and (3) dynamics (see FIG. 1A). As used herein, the term "structure" refers to a constantly stationary portion such as a wall surface in the indoor space. The structure means a completely static element having no movement because it is not changed as long as a factor of changing the internal environment like the interior construction does not occur. The structure defines a volume of the indoor space. Thus, in the case where the structure is observed in the indoor space, there is a high possibility that the structure would be disposed at the outermost portion of the indoor space.

In addition, as used herein, the term "object" refers to a temporarily static element or a potentially dynamic element which maintains a temporarily static state in a situation where the object is placed as it is while being present in the indoor space, but which may be changed in the position or direction thereof within a corresponding time period upon the lapse of a short time period ranging from several seconds to several hours.

In the meantime, as used herein, the term "dynamics" refers to a dynamic element which is present in the indoor space and whose motion occurs at a current time point.

However, conventional localization and object recognition technologies are implemented in an environment totally different from actual environment requirements which require a dynamic environment including a potentially dynamic element or a dynamic element having an object or a dynamics in that they are implemented under the control of a static environment. In other words, because the static environment including only the structure is based on the assumption that any extracted feature is stationary in an environment or is present under a controlled motion, there exists a possibility that an object or a person which is not controlled under the dynamic environment will move in an unpredicted direction. Thus, there is a problem in that it is difficult to directly apply the conventional localization and object recognition technology to the dynamic environment similar to a real environment.

In order to solve such a difficulty, there is needed either a technology of grasping the structure whose position will not be changed in the dynamic environment or a technology of grasping the object or the dynamics whose position will be changed in the dynamic environment, i.e., a technology of capable of separating the static element and the potentially dynamic element or the dynamic element.

An example of such a structure can include wall structure information. When the wall structure information is carefully observed in any space, most of the wall structure, i.e., the structure is positioned at an outer portion. In other words, it can be seen that when an environment is observed in an indoor space, the wall structure, i.e., the structure is positioned behind the dynamics or the object.

SUMMARY OF THE INVENTION

Accordingly, the present invention has been made to solve the above-mentioned problems occurring in the prior arts. It is an object of the present invention to provide a method for extracting outer space feature information from spatial geometric data in which outer information of a space is extracted from geometric data of the space so that a structure, an object, and a dynamics can be separated or individually extracted and secured in an environment in which the structure, the object, and the dynamics are disposed mixedly, and various technologies applicable to a conventional static environment can be applied even under the environment in which the structure, the object, and the dynamics are disposed mixedly, and a device for implementing the same.

To achieve the above object, in one aspect, the present disclosure provides a method for extracting outer space feature information from spatial geometric data. The method includes: an input step S10 of inputting spatial geometric data for a target region; a sampling step S20 of determining a sample by selecting an arbitrary area for the spatial geometric data input in the input step using a preset selection method; and a feature extraction step S30 of acquiring feature information for a corresponding sampling plane using a convex hull method based on sampling information including sampling plane information of the spatial geometric data for a sampling plane selected in the sampling step.

In the method for extracting outer space feature information from spatial geometric data, the sampling step and the feature extraction step may be repeatedly performed by a preset method, if necessary.

In the method for extracting outer space feature information from spatial geometric data, the sampling step S20 may determine the sample by selecting a crossing area where the spatial geometric data and a crossing plane cross each other within a preset margin.

In the method for extracting outer space feature information from spatial geometric data, the sampling step S20 may include: a sampling plane determination step S21 of selecting the sampling plane as the crossing plane defining the cross area with the spatial geometric data; and a sample determination step S23 of acquiring sampling plane information as spatial geometric data that is present in the preset margin with respect to the sampling plane among the spatial geometric data.

In the method for extracting outer space feature information from spatial geometric data, in the sampling plane determination step S21, the sampling plane may include a sampling plane formed at a predetermined angular interval on a ground surface including a preset sampling origin which is positioned in the target region.

In the method for extracting outer space feature information from spatial geometric data, in the sampling plane determination step S21, the sampling plane may be a plane including a vertical line segment perpendicular to the ground surface while passing through the preset sampling origin which is positioned in the target region, and may be formed at a predetermined angular interval centering on the vertical line segment.

In the method for extracting outer space feature information from spatial geometric data, information on the preset sampling origin may be position information at the time point of observation with respect to a sensing position of a sensing unit that acquires the spatial geometric data.

In the method for extracting outer space feature information from spatial geometric data, in the sampling plane determination step S21, the sampling plane may include a sampling plane formed at the predetermined angular interval (i.e., arbitrary three-dimensional angular interval) on the ground surface including the position information at the time point of observation and the preset sampling origin which is positioned in the target region, and the position information at the time point of observation may be arbitrary position information in the target region.

In the method for extracting outer space feature information from spatial geometric data, in the sampling plane determination step S21, the sampling plane may be a plane including a vertical line segment perpendicular to the ground surface while passing through the position information at the time point of observation and the preset sampling origin, and may include a sampling plane formed at a predetermined angular interval centering on the vertical line segment. The position information at the time point of observation may be arbitrary position information in the target region.

In the method for extracting outer space feature information from spatial geometric data, the sample determination step S23 may include: a sample projection step S231 of projecting the spatial geometric data that is present in the preset margin with respect to the sampling plane determined in the sampling plane determination step S21 onto the sampling plane; and a sampling plane information confirmation step S233 of setting the spatial geometric data projected onto the sampling plane in the sample projection step S231 as the sampling plane information.

In the method for extracting outer space feature information from spatial geometric data, the feature extraction step S30 may include: a determined sample input step S31 of specifically inputting sampling information in which the sample determined in the sampling step S20 includes plane information; a sample convex hull execution step S33 of calculating convex hull information by application of a convex hull based on the sampling information input in the determined sample input step S31; and a sample feature confirmation step S35 of confirming a crossing portion in a preset range between the sampling information and the convex hull information to be a feature extracted for the sampling plane.

In the method for extracting outer space feature information from spatial geometric data, the sampling information may include the sampling plane information and the position information at the time point of observation, and the sample convex hull execution step S33 may apply the convex hull by including the position information at the time point of observation.

In the method for extracting outer space feature information from spatial geometric data, the sample feature confirmation step S35 may include: an outer sample information calculation step S351 of calculating outer sample information by setting a preset feature margin range around the convex hull information; and a sample feature setting step S355 of setting, as a sample feature, spatial geometric data corresponding to the outer sample information calculated in the outer sample information calculation step S351 among the sampling plane information.

In the method for extracting outer space feature information from spatial geometric data, the method may further include: a reference data comparison step of comparing the outer space feature with reference data which is input in the input step after the completion of the feature extraction step; and a comparison result output step of outputting whether or not the outer space feature is identical to the reference data based on a result of the comparison in the reference data comparison step.

In the method for extracting outer space feature information from spatial geometric data, the method may further include: a dynamic element extraction step of extracting dynamic elements using the outer space feature and the spatial geometric data which is input in the input step after the completion of the feature extraction step, and confirming whether or not a new dynamic element is present in the dynamic elements; and a mode output step of performing a warning mode if the new dynamic element is maintained for more than a preset time period based on a result of the comparison in the dynamic element comparison step.

ADVANTAGEOUS EFFECTS

The method and device for extracting outer space feature information from spatial geometric data as constructed above have the following advantageous effects.

First, according to the method and device for extracting outer space feature information from spatial geometric data, outer feature information is extracted based on the inputted spatial geometric data so that wall structure information can be mostly extracted.

Second, according to the method and device for extracting outer space feature information from spatial geometric data, the extracted outer information always can secure a structure in a dynamic environment, and a structure can be separated from an object or a dynamics to distinguish the structure from the object or the dynamics in a target region where a dynamic environment is generated.

Third, according to the method and device for extracting outer space feature information from spatial geometric data, the extracted structure is used as a feature point in various conventional technologies so that conventional technologies can be utilized in the dynamic environment. In other words, the present method can be utilized in all the technologies employing a feature point such as a localization technology or an object recognition technology.

Fourth, according to the method and device for extracting outer space feature information from spatial geometric data, in the inputted spatial geometric data, a portion which is not outer information is a portion to which the object or the dynamics belongs, and thus a set of the object or the dynamics can be obtained, which can be utilized as input data in the conventional technologies of processing the object or the dynamics. In addition, the structure is mostly excluded from the input data, thereby improving the efficiency of the conventional technologies.

Fifth, according to the method and device for extracting outer space feature information from spatial geometric data, because the same technique is repeatedly performed on various planes, the present method is suitable for the parallel processing to optimize the calculation speed so that the feature information can be derived from the outer space. In addition, a real-time calculation can be performed, if necessary. Thus, although the inventive method is performed together with other technologies which were applied to the conventional object recognition, localization or autonomous navigation, which can be applied to the static environment, a calculation load is not excessively increased so that a calculation time can be shortened.

Sixth, according to the method and device for extracting outer space feature information from spatial geometric data, if the object and the dynamics are distinguished from each other or the static feature point is used, all of the input data is remarkably decreased by a convex cut so that an ultimate reduction in the calculation amount can be achieved due to a reduction in the input data through the preprocessing.

Seventh, according to the method and device for extracting outer space feature information from spatial geometric data, the localization and mapping technology and the object recognition technology which are considered to be excellent in the prior art can be applied even in the dynamic environment through the distinguishment between the structure and the object or the dynamics. The present method can also be applied to a construction supervision field by the real-time detection and measurement in a separate construction step through a comparison with design information used as a design criteria through the separation the structure from the object or the dynamics in the dynamic environment

BRIEF DESCRIPTION OF THE DRAWINGS

The above and other objects, features and advantages of the present invention will be apparent from the following detailed description of the preferred embodiments of the invention in conjunction with the accompanying drawings, in which.

Figure 1A:
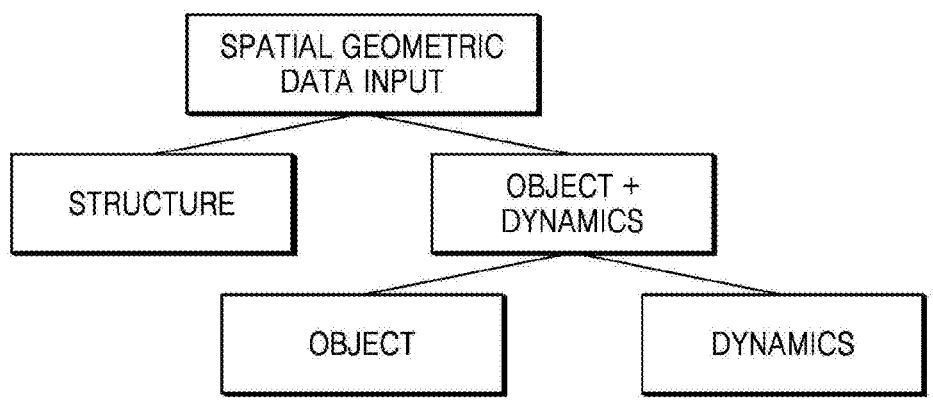
FIG. 1A illustrates a relationship diagram of spatial geometric data, which is classified into a structure, an object, and a dynamics, and a view.

EXPLANATION ON REFERENCE NUMERALS
OF MAIN ELEMENTS IN THE DRAWINGS

1: mobile robot
10: sensing unit
15: input unit
20: control unit
30: storage unit
40: arithmetic unit
50: output unit

DESCRIPTION OF THE PREFERRED
EMBODIMENTS

Hereinafter, a method for extracting outer space feature information from spatial geometric data will be described in detail with reference to the accompanying drawings.

The present disclosure provides a method for extracting information on a structure such as a wall which constitutes relative fixed position information from spatial geometric data.

Figure 1B:
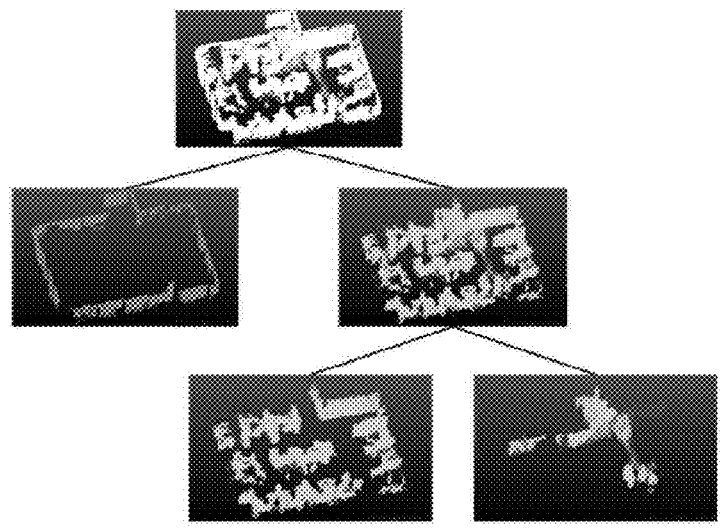
FIG. 1B illustrates a state in which various items of spatial geometric data is individually separated and extracted as a structure, an object, and a dynamics.
Figure 1C:
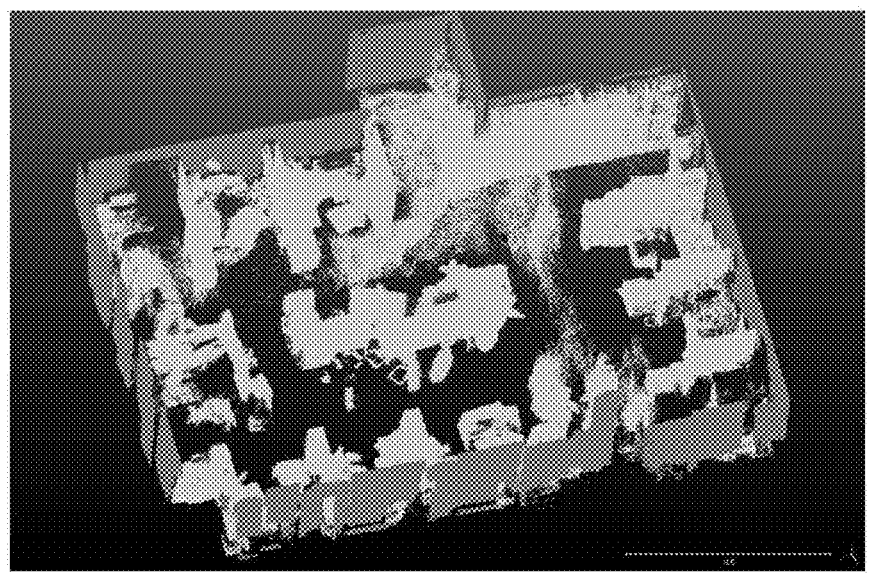
FIG. 1C is a state view illustrating the separated and extracted spatial geometric data, in which the structure, the object, and the dynamics which are separated and extracted are converted into different colors, and then are superposedly disposed.
Figure 1D:
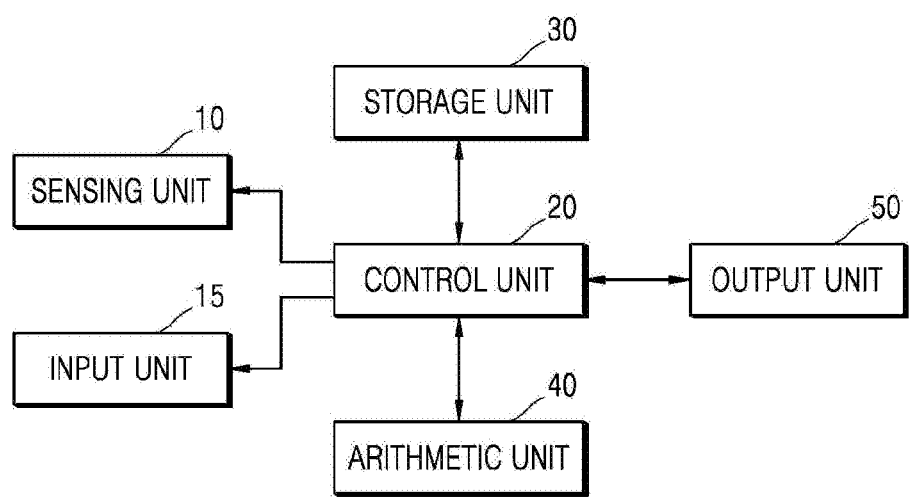
FIG. 1D is a block diagram illustrating a configuration of a device for extracting outer space feature information from spatial geometric data.

FIG. 1A illustrates a relationship diagram of spatial geometric data, which is classified into a structure, an object, and a dynamics, and a view. FIG. 1B illustrates a state in which various items of spatial geometric data is individually separated and extracted as a structure, an object, and a dynamics. FIG. 1C is a state view illustrating the separated and extracted spatial geometric data, in which the structure, the object, and the dynamics which are separated and extracted are converted into different colors, and then are superposedly disposed. FIG. 1D is a block diagram illustrating a configuration of a device for extracting outer space feature information from spatial geometric data.

The method for extracting outer space feature information from spatial geometric data may be used in a mapping process of a mobile robot, in the reconstruction of CAD data at the time of the construction work in a range of capable of extracting wall structure information, or in a real-time sensor data acquisition work at a crowded space, if necessary. In addition, the method described herein can be used in a wide range of applications such as being implemented of a sensor system whose position can be shifted or fixed and which can be temporarily translated and rotated, besides a mobile robot. In this scenario, for the sake of convenience of understanding, although it has been described that information on a structure such as wall information is extracted from spatial geometric data such as point cloud data, various modifications are possible in a range in which a structure and an object or a dynamics can be extracted or separated from various items of spatial geometric data.

The spatial geometric data for a target region used herein is data including three-dimensional geometric data such as raw data acquired by a sensor system which can acquire various items of geometric data such as a laser range finder (LRF) or a stereo camera, point cloud data, mesh data, three-dimensional modeling data or the like, obtained by processing the raw data. The spatial geometric data may include data from which a noise is removed by a predetermined noise filtering process without being limited to the form of data, or sensor data acquired from an IR-based depth sensor, an RGB sensor, a kinect sensor, a kinect 2 sensor, a tango sensor or the like. In addition, if the amount of data/information is restricted, if necessary, raw data acquired in a step previous to an input step in the steps of a method as described below or three-dimensional geometric data may be converted or integrated into localization data and the spatial geometric data may include various forms of data in a technical field to which the present method pertains. In other words, as described above, although the spatial geometric data is described centering on the point cloud data, it is not limited thereto.

In the use of the method for extracting outer space feature information from spatial geometric data, if a method of employing spatial geometric data sensed during the traveling of a mobile robot 1 is used, there is provided a device 2 for extracting outer space feature information from spatial geometric data, which includes a sensing unit 10, an input unit 15, a control unit 20, a storage unit 30, an arithmetic unit 40, and an output unit 50, which are provided in a mobile robot 1 (see FIG. 1c). In this scenario, although the device 2 has a structure in which the sensing unit 10, the input unit 15, the storage unit 30, the arithmetic unit 40, and the output unit 50 may be directly connected to the control unit 20, it is apparent from the present disclosure that the device 2 may have a configuration in which the control unit 20 is connected to the respective elements so as to transfer a control signal to the elements, and the input unit 15, the storage unit 30, the arithmetic unit 40, and the output unit 50 are directly connected to each other, if necessary.

In the method for extracting outer space feature information from spatial geometric data as described below, the device 2 for extracting outer space feature information from spatial geometric data is provided and then the spatial geometric data is input to the device for extracting outer space feature information from spatial geometric data. In the input step, spatial geometric data for a target region/space is input. The input step may be executed as a sensing and input step of sensing and inputting spatial geometric data for the target region through the sensing unit 10.

The sensing unit 10 is implemented as a device such as a scanner or the like. The point data detected by the sensing unit 10 is positional data on a coordinate axis for an object, which is present in a sensing region of the sensing unit 10 and is generally represented as point cloud data.

The sensing unit 10 can perform a sensing and input step as a predetermined input step S10 in response to a sensing control signal as an input control signal of the control unit 20. In this process, as described above, the point cloud data sensed by the sensing unit 10 may be directly input as raw data, and may be input after removing a noise or the like from the sensed point cloud data through a predetermined noise filtering process. As such, various modifications are possible depending on the design specification.

In addition, the spatial geometric data in the input step S10 may be completed form of spatial geometric data which is directly input by the input unit 15, if necessary. In this case, a user may input the completed form of spatial geometric data for a space defined by the target region, for example, such as CAD data using the input unit 15, and may input arbitrary spatial geometric data, if necessary. As such, various modifications are possible.

Further, the input unit 15 allows preset data by the user to be stored in the storage unit 30 connected to the control unit 20 of the mobile robot, and the arithmetic unit 40 performs a predetermined calculation process in response to a calculation control signal form the control unit 20 and then enables the extraction of the outer feature information for the target region. The output unit 50 outputs feature information extracted through a predetermined step from point cloud data which the mobile robot senses while moving around, i.e., information on a wall structure as a structure defined herein so as to allow the user to use the output information. In addition, in a vice-versa case, the output unit 50 may have a configuration in which an object or a dynamics is extracted except the structure or a changed object or dynamics of the structure is extracted so as to actively cope with an output environment required by a worker, if necessary.

In the meantime, the mobile robot is provided with a driving unit serving as a motor so that a given position change thereof can be achieved. Such a motor enables an encoder or the like to trace coordinate transformation including a translational movement and a rotational movement that cause the position change of the mobile robot, i.e., a change in the reference position with respect to a coordinate system so that although a change in the position occurs due to the transfer of the mobile robot from a reference position, the coordinate transformation can be used as coordinate transformation data enabling conversion of a coordinate to the reference position.

In a process of describing the present method, although it has been described that data of the encoder sensing the rotation of the motor of the mobile robot is used, this is merely an example for description. Data of a sensor for detecting the position of the mobile robot such as a Stargazer may be used as data used in a coordinate transformation process for the implementation of the method for extracting outer space feature information from spatial geometric data, and the present invention may have a configuration in which conversion of a coordinate into the reference position is achieved using positional data acquired by a conventional localization technology such as self-position discrimination using feature points extracted from various input information. As such, various modifications are possible depending on the design specification.

In addition, in the device for extracting outer space feature information from spatial geometric data, the coordinate transformation data of the mobile robot can be set in a range of providing spatial geometric data for the target region by using current position information at the time point of observation where point cloud data detected by the mobile robot or the sensing unit is acquired. As such, in the device for extracting outer space feature information from spatial geometric data, the localization method may be modified in various manners so as to utilize the current position in a range of enabling the localization.

Hereinafter, a method for extracting outer space feature information from three-dimensional spatial geometric data will be described with reference to the accompanying drawings.

As described above, the method for extracting outer space feature information from spatial geometric data can be used in a variety of fields. In this scenario, a description has been made centering on the mobile robot for the sake of convenience of understanding, but the present invention is not limited thereto.

Figure 2:
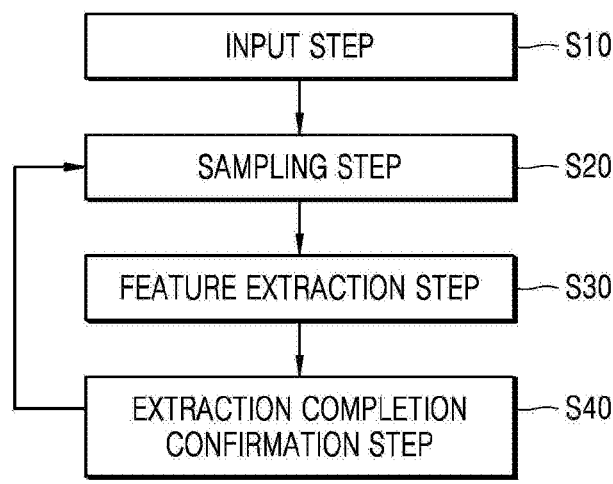
FIG. 2 illustrates a flow chart illustrating a method for extracting outer space feature information from spatial geometric data.
Figure 3:
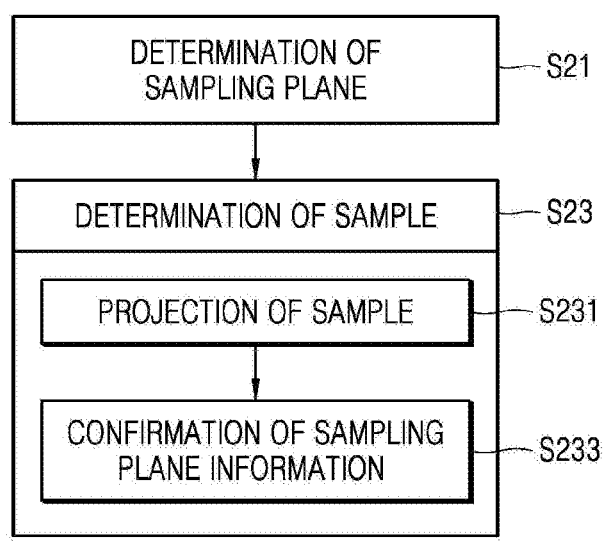
FIGS. 3 and 4 are flow charts illustrating concrete steps of a method for extracting outer space feature information from spatial geometric data.
Figure 4:
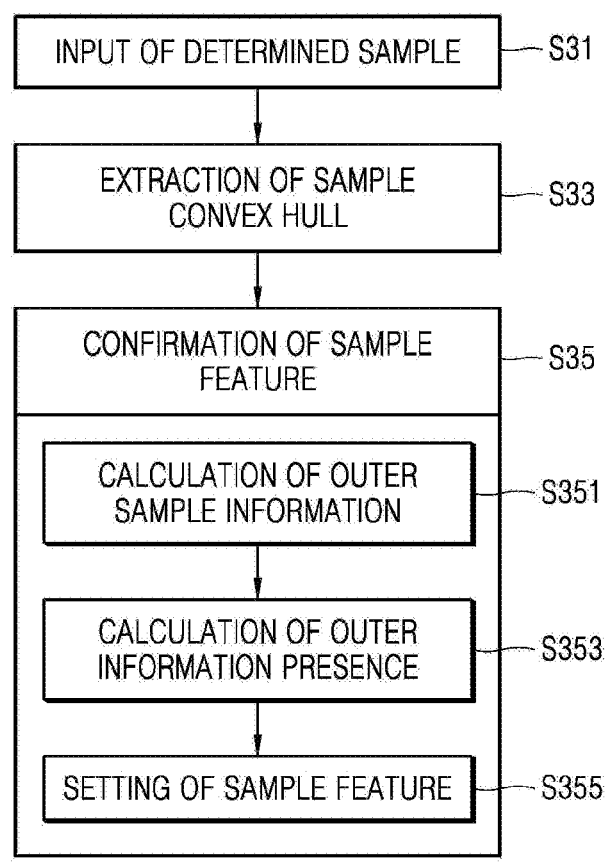
Figure 5:
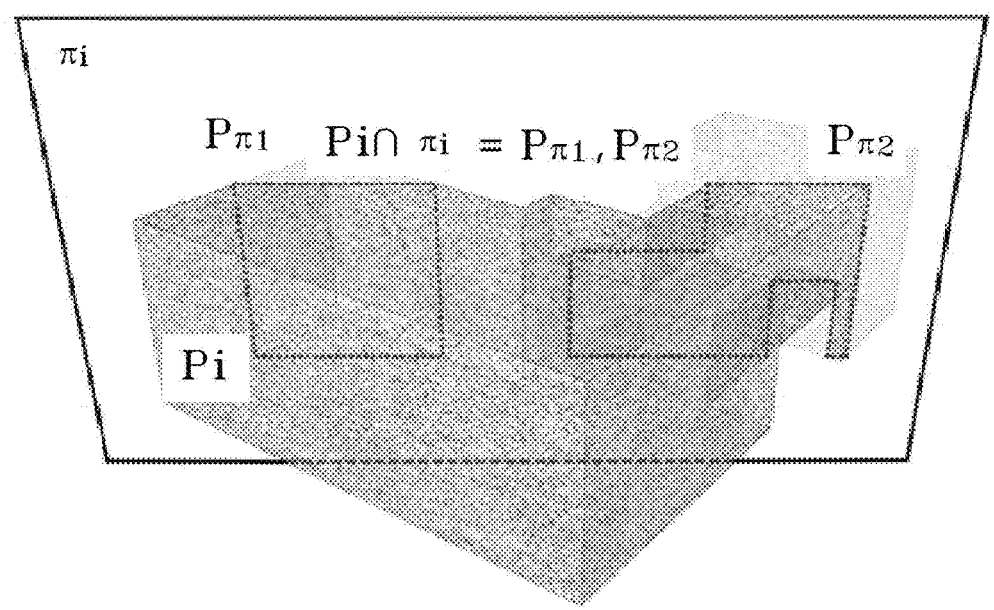
FIG. 5 is a relationship between spatial geometric data, which is implemented as point cloud data in a target region, and a sampling plane.
Figure 6:
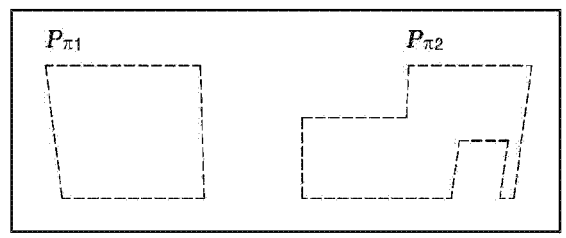
FIGS. 6, 7 and 8 are diagrammatic views illustrating a sampling step and a feature extraction step in a method for extracting outer space feature information from spatial geometric data.

As shown in FIG. 2, a method for extracting outer space feature information from three-dimensional spatial geometric data includes an input step S10, a sampling step S20, and a feature extraction step S30. The sampling step S20 and the feature extraction step S30 can be executed repeatedly by a predetermined number of times by a method previously set and stored in the storage unit 30. This repeated execution may employ a method which is executed by counting whether or not projection is totally completed with respect to a sampling plane which will be described later through a separate extraction completion confirmation step S40. In addition, a feature information accumulation step is performed in which features extracted after the completion of extraction are stored in the storage unit 30 and various items of feature information is accumulated so that a wide range applications using a more rapid and accurate extraction of the outer space feature information can be implemented. For example, the method for extracting outer space feature information may be implemented by a technology in which a spatial geometric element is extracted as accumulation data itself based on the feature information extracted in the feature extraction step or accumulation data including the feature information accumulated by repeatedly performing the feature extraction step, or a corresponding feature point or feature information is extracted based on a corresponding point as spatial geometric data represented by the accumulation data or additional association information such as RGB color, row, material, transparency, and image intensity associated with the corresponding point. In addition, the method for extracting outer space feature information may be implemented as a method of utilizing a feature point extracted using data accumulated from collective data or non-accumulation data itself. In this scenario, a control calculation process using a single processor has been used, but the control calculation process may be executed using a plurality of processors enabling the parallel processing so as to secure tenacity even for a vast amount of calculation and a rapid calculation process may enable the extraction of the outer feature information.

As mentioned above, first, the device for extracting outer space feature information from spatial geometric data is provided, and then the input step S10 is executed in response to a control signal from the control unit 20 so that predetermined three-dimensional spatial geometric data for a target region is input.

The three-dimensional spatial geometric data may be spatial geometric data for the target region, which is input through the sensing unit or the like, spatial geometric data such as completed form of CAD data, or arbitrary spatial geometric data. As such, the three-dimensional spatial geometric data can be selected in various manners depending on the design specification.

The input of the spatial geometric data for the target region is performed in the input step S10, and then the program proceeds to the sampling step S20 where the control unit 20 determines a sample by selecting a sampling area for the spatial geometric data Pi input in the input step S10 using a preset selection method. Herein, the preset selection method refers to a method of selecting an area to be sampled from the spatial geometric data in such a manner that the spatial geometric data and a crossing plane selected within the target region cross each other within a preset margin. More specifically, the control unit 20 selects the crossing plane for the target region using the preset selection method, forms a predetermined marginal space centering on the selected crossing plane using margin information included in the preset data stored in the storage unit 30, and then determines, as a sample, spatial geometric data that is present in the marginal space formed centering on a corresponding crossing plane.

In other words, the sampling step S20 includes a sampling plane determination step S21 and a sample determination step S23. In the sampling plane determination step S21, the control unit 20 selects a sampling plane as the crossing plane defining a crossing area with the spatial geometric data Pi. The sampling plane ($\pi_i$; i=1, 2, 3, ..., n) is selected in the target region. The sampling plane $\pi_i$ may be selected as an arbitrary plane, or may be selected by the preset selection method. In other words, the sampling plane $\pi_i$ which is the crossing plane defining the crossing area with the spatial geometric data Pi may be selected as an arbitrary plane having an arbitrary plane vector direction, or may be selected by the preset selection method.

Preferably, the sampling plane $\pi_i$ selected in the sampling plane determination step S21, which is the crossing plane defining the crossing area with the spatial geometric data, is formed as a plane including a z-axis perpendicular to a ground surface or a vertical line segment parallel to the z-axis. In other words, the sampling plane $\pi i$ as the crossing plane is formed as a vertical plane including a vertical line segment perpendicular to the ground surface so that the amount of calculation can be reduced, thus leading to a reduction in the calculation load of the control unit and the arithmetic unit.

In another example, the sampling plane may be formed as a plane horizontal to the ground surface. The horizontal plane as the sampling plane may reduce the calculation load of the arithmetic unit similarly to the vertical plane, but in this scenario, it is described that the plane vertical to the ground surface is formed as the sampling plane.

In addition, such a sampling plane may be configured to include a preset origin. The sampling plane in this scenario is formed as a plane including a vertical line segment extending vertically from the preset origin.

Herein, if the sampling plane is selected as an arbitrary plane, the preset origin may be selected as position information for one arbitrary point within the target region. If the sampling plane is selected by the preset selection method, the preset origin may be formed as position information at the time point of observation with respect to a specific position, i.e., a sensing position of a mobile robot or a sensing unit mounted in the mobile robot.

Figure 20:
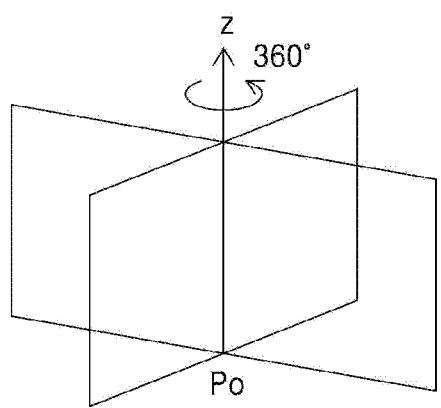
FIG. 20 is a diagrammatic view illustrating a method in which omnidirectional sampling planes are formed at a preset angular interval using as a preset origin a point where a sensing unit is positioned in a target region.
Figure 21:
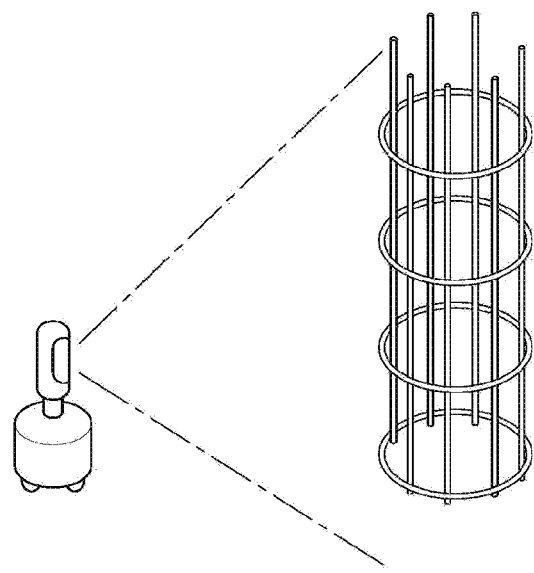
FIG. 21 is a schematic state view illustrating another example of a method for extracting outer space feature information from spatial geometric data, which is used in a construction work.

Meanwhile, the method for extracting outer space feature information from spatial geometric data is characterized in that the sampling plane includes a coverage covering all directions of 360° including a predetermined angular interval, i.e., one of the preset data stored in the storage unit 30 centering on the vertical line segment extending upwardly from the preset origin so as to be perpendicular to the ground surface so that the three-dimensional spatial geometric data can be processed. In this scenario, the predetermined angular interval was set to 1° (see FIG. 20).

For example, in the case where the spatial geometric data for the target region is input in the form of CAD data without the necessity for a separate sensing process, the sampling plane determination step S21 forms an arbitrary point in the target region as the preset origin and forms a plurality of sampling planes at predetermined angular interval of 1° centering on a vertical line segment perpendicular to the arbitrary point so that the sampling step and the feature extraction step can be repeatedly performed until the sample determination and the feature extraction are performed on any one sample plane including a corresponding preset origin, and then the formation of the sampling plane and the extraction of the feature achieve a coverage of 360° centering on the corresponding origin.

After such a sampling plane $\pi_i$ is formed, the control unit 20 executes the sample determination step S23 where the control unit 20 acquires sampling plane information as spatial geometric data that is present in an area having a preset margin, i.e., one of data contained in the preset data stored in the storage unit 30 with respect to the sampling plane $\pi_i$ among the spatial geometric data.

More specifically, the sample determination step S23 includes a sample projection step S231 and a sampling plane information confirmation step S233. In the sample projection step S231, the control unit 20 projects the spatial geometric data that is present in a preset margin with respect to the sampling plane $\pi_i$ determined in the sampling plane determination step S21 onto the sampling plane. Then, in the sampling plane information confirmation step S233, the control unit 20 sets the spatial geometric data projected onto the sampling plane $\pi_i$ in the sample projection step S231 as the sampling plane information.

In other words, as shown in the drawings, imaginary marginal planes $\pi_{mrg}$ spaced apart by a preset margin $d_{mrg}$ from the sampling plane $\pi_i$ are formed to define a preset marginal space therebetween, and the spatial geometric data $P_j$ present between the sampling plane $\pi_i$ and the imaginary marginal planes $\pi_{mrg}$ are projected onto the sampling plane $\pi_i$ to form sampling plane information $P_{\pi i}$. Then, the control unit 20 can acquire the sampling plane information $P_{\pi i}$ and store it in the storage unit 30.

In this scenario, the present invention has a structure of projecting the spatial geometric data present in a marginal space of a predetermined distance at the outside of the sampling plane $\pi_i$ or a marginal zone between the sampling plane $\pi_i$ and the marginal planes $\pi_{mrg}$, but may have a structure in which a margin function is provided for formation of a margin from the sampling plane besides the marginal plane to form a different margin distance at each position of the sampling plane, and the spatial geometric data present in the marginal zone defined by the sampling plane and the margin distance is used, if necessary. As such, various methods can be selected for formation of the margin from the sampling plane.

Figure 26:
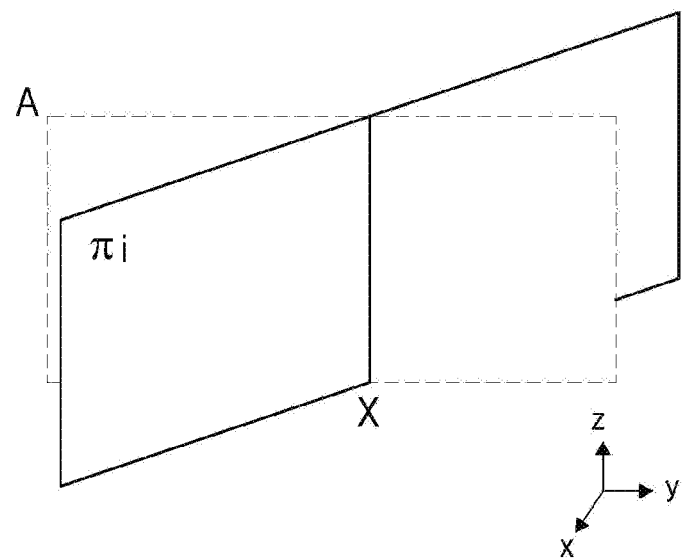
FIGS. 26 and 27 are diagrammatic views illustrating sampling plane information obtained by vertically projecting spatial geometric data, which is present in a marginal zone, onto a sampling plane in a method for extracting outer space feature information from spatial geometric data.
Figure 27:
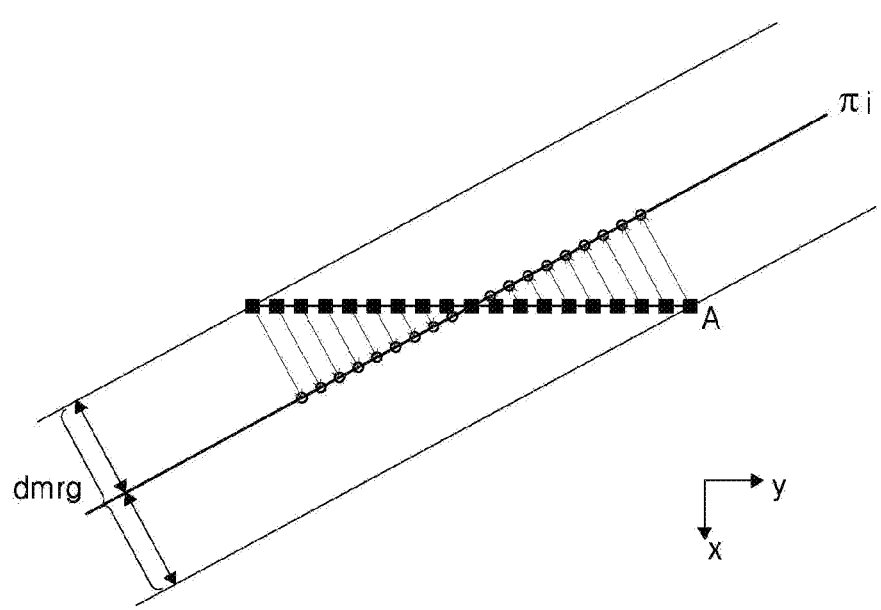

In addition, the projection operation in this scenario may be performed using a vertical projection method, and various modifications are possible, such as being projected at a constant angle. In other words, as shown in FIG. 26, the spatial geometric data present in the marginal zone is vertically projected on the sampling plane so that the sampling plane information can be obtained (see FIG. 27).

Figure 28:
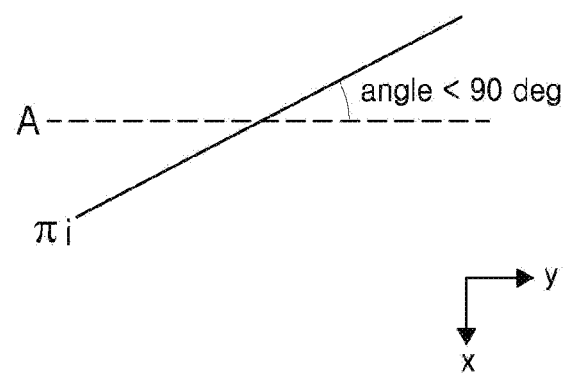
FIGS. 28, 29 and 30 are diagrammatic views illustrating sampling plane information obtained by projecting spatial geometric data, which is present in a marginal zone, onto a sampling plane in a method for extracting outer space feature information from spatial geometric data.
Figure 29:
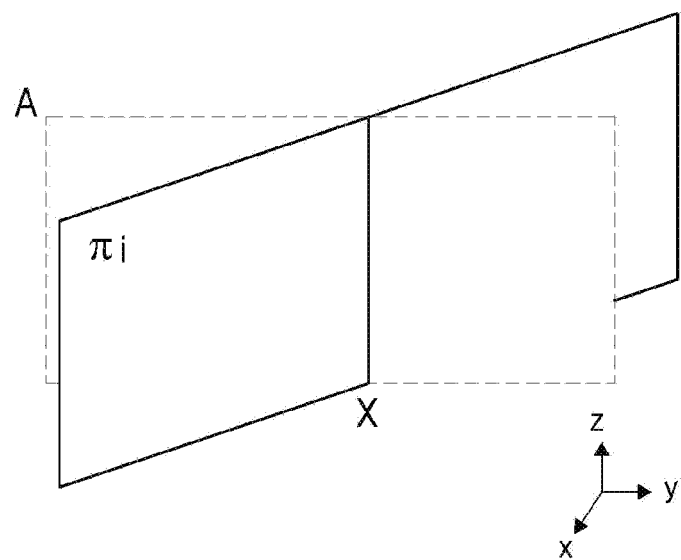
Figure 30:
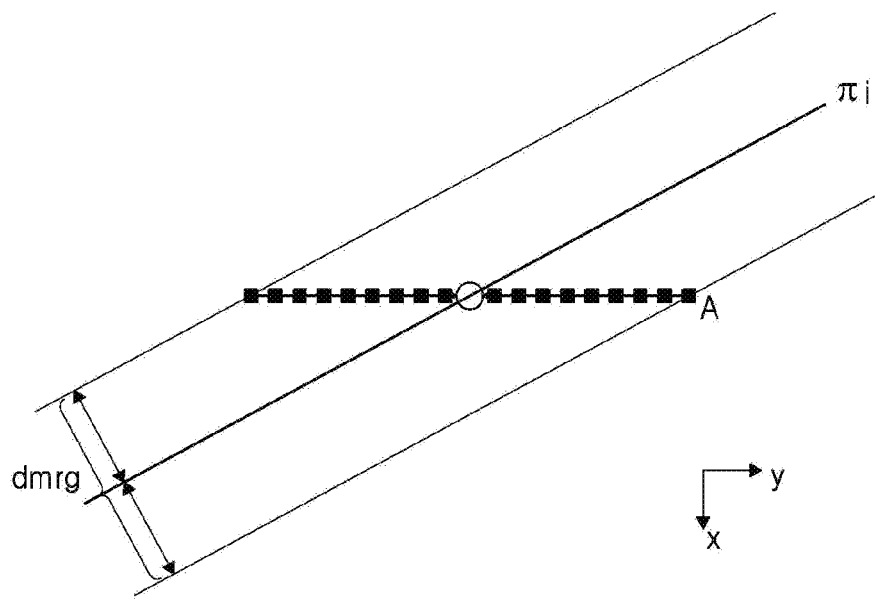

In addition, as shown in FIGS. 28 to 30, a plane A is extracted from given spatial geometric data. The corresponding plane A can intersect the sampling plane $\pi_i$ at a constant angle. In this case, a crossing line X can be obtained which the corresponding plane A and the sampling plane $\pi_i$ define. The spatial geometric data present in the marginal zone defined by the sampling plane $\pi_i$ among the spatial geometric data constituting the corresponding plane A is vertically projected on the crossing line X so that the sampling plane information $P_{\pi i}$ for the sampling plane $\pi_i$ can be derived. In this case, unlike in the case of FIG. 27, the sampling plane information arranged on the crossing line X may be utilized to enable a more accurate derivation of a convex hull.

After the completion of the sampling step 20, the control unit 20 performs the feature extraction step S30. The feature extraction step S30 includes a determined sample input step S31, a sample convex hull execution step S33, and a sample feature confirmation step S35.

The determined sample input step S31 specifically inputs sampling information in which the sample determined in the sampling step S20 includes plane information. As described above, when the spatial geometric data is sensed and input by the sensing unit, the sampling information may include position information at the time point of observation for a sensing position where the spatial geometric data is sensed. The position information at the time point of observation is formed as position information of a preset origin for forming a plurality of sampling planes. As such, position information at the time point of observation for the sensing position, i.e., information on the preset origin where the mobile robot is positioned can complement a problem occurring in the extraction of the inherent outermost portion as a feature upon the extraction of the feature from the intersection with a convex hull which will be described later due to an occlusion of the outer information or a limitation of a field of view (FOV) which may occur due to the sensing position by rectilinear propagation of an electromagnetic wave sensed by the sensing unit.

Figure 18:
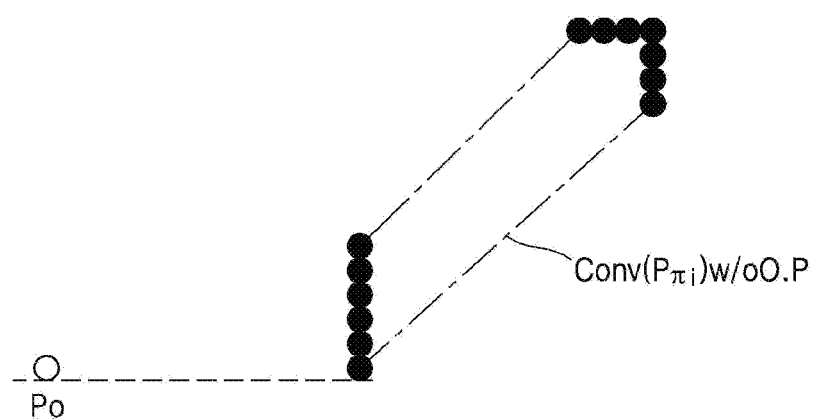
FIGS. 18 and 19 are diagrammatic views illustrating a difference therebetween in terms of convex hull information and sampling plane information obtained from spatial geometric data depending on presence or absence of position information at the time point of observation in a feature extraction step of a method for extracting outer space feature information from spatial geometric data.

In other words, as shown in the drawings, if the position information at the time point of observation is not included in the sampling information while using the spatial geometric data for the same region, there is a low possibility that feature information obtained by the intersection between sampling plane information and a convex hull extracted from corresponding sampling plane information with respect to a corresponding space will be secured as an outer space feature of an outer region Ss occluded by an inner structure Is of the target region while including spatial geometric data of the inner structure Is of the target region (see FIG. 18).

Figure 19:
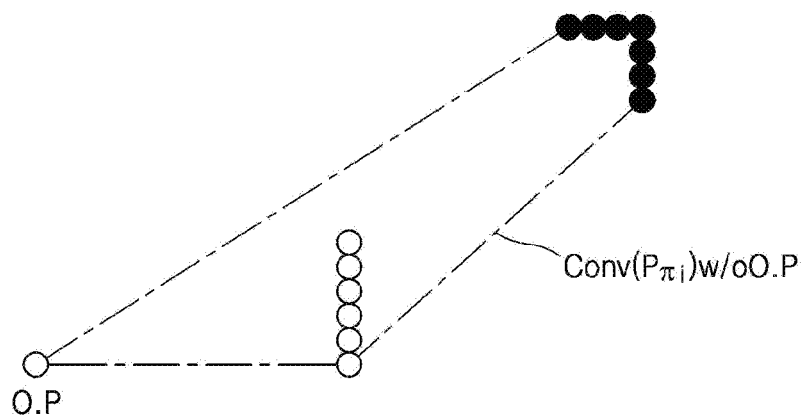

On the other hand, if position information at the time point of observation is not included in the sampling information, there is a high possibility that feature information obtained by the intersection between sampling plane information and a convex hull extracted from corresponding sampling plane information with respect to a corresponding space will be secured as an outer space feature of the outer region Ss occluded by the inner structure Is of the target region by focusing on extracting an outer space feature through further expansion of an inner region of the target region due to position information at the time point of observation, and thus a possibility can be increased that the outer space feature information will be extracted more accurately (see FIG. 19).

Figure 7:
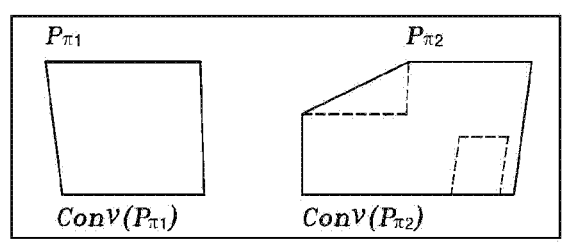
Figure 8:
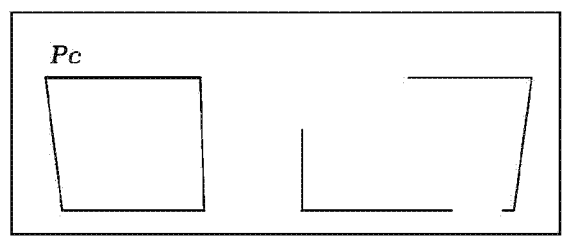
Figure 9:
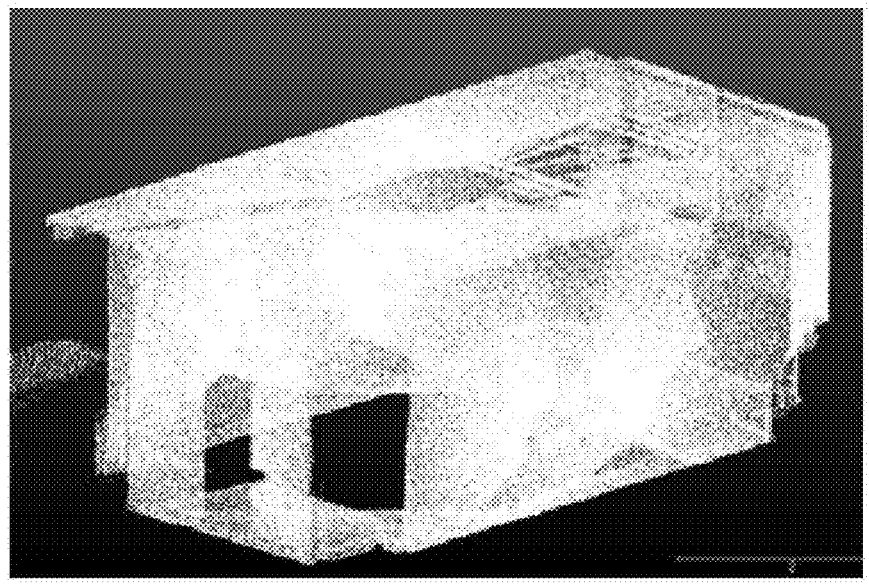
FIG. 9 is a diagrammatic view illustrating feature information which is extracted from an outer space for a target region by a method for extracting outer space feature information from spatial geometric data.
Figure 10:
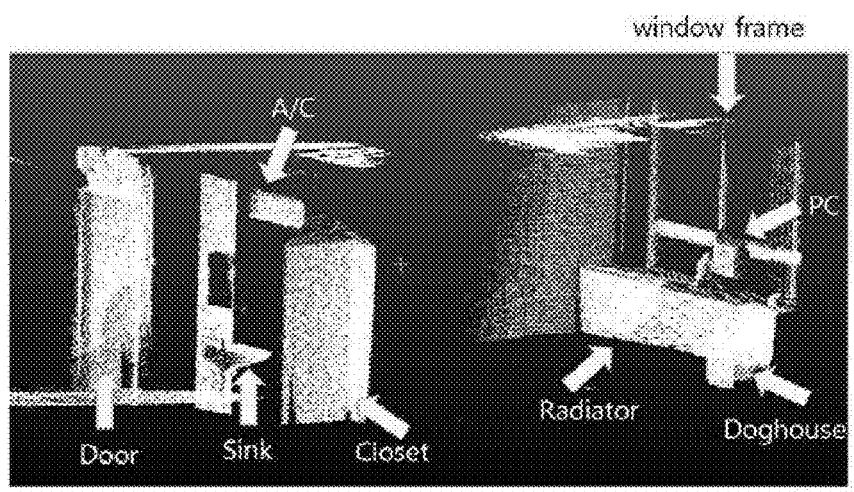
FIG. 10 is a diagrammatic view illustrating objects or dynamics except the outer space feature information extracted among spatial geometric data for the target region by a method for extracting outer space feature information from spatial geometric data.
Figure 17:
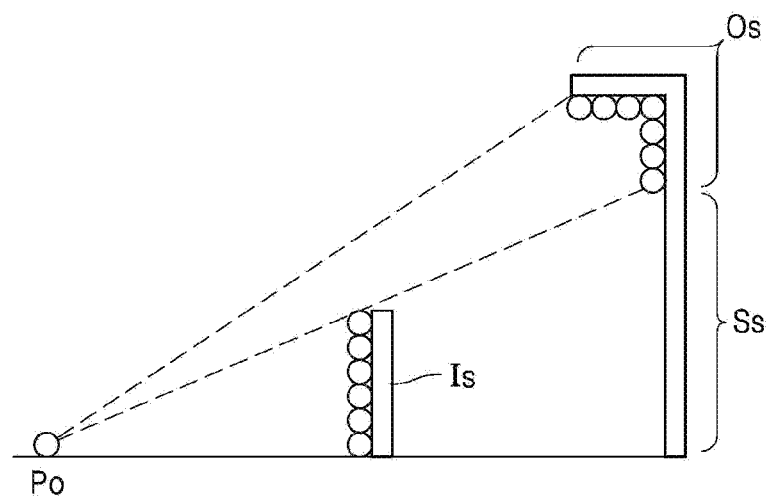

After the sampling information including the sampling plane information is input in the determined sample input step S31, the control unit 20 performs the sample convex hull execution step S33 where the control unit 20 calculates convex hull information $conv(P_{\pi i})$ (see FIG. 7) formed by sampling plane information $P_{\pi i}$ or the sampling plane information $P_{\pi i}$ and the position information Po at the time point of observation (see FIG. 17) by applying a convex hull. In this case, a typical convex hull calculation process can be used in the application of the convex hull.

Thereafter, the control unit 20 performs the sample feature confirmation step S35 where the control unit 20 extracts a crossing portion in a preset range between the sampling information including the sampling plane information $P_{\pi i}$ and the convex hull information $conv(P_{\pi i})$ with respect to the sampling plane and confirms spatial geometric data corresponding to the extracted sampling information to be a feature. In this case, the preset range which is one of the preset data stored in the storage unit 30 can be used as a determination criterion for determining whether or not the sampling information including the sampling plane information $P_{\pi i}$ and the convex hull information $conv(P_{\pi i})$ cross each other and match with each other substantially.

Herein, if the spatial geometric data input in the input step is sensed and input by the sensing unit, the sampling information may include the position information at the time point of observation, and the sample convex hull execution step may apply the convex hull by including position information at the time point of observation.

More specifically, the sample feature confirmation step S35 may include am outer sample information calculation step S351, an outer information presence confirmation step S353, and a sample feature setting step S355.

Figure 23A:
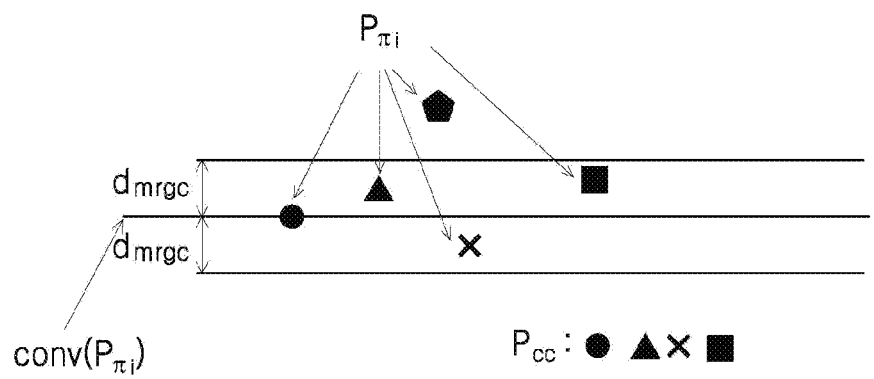
FIGS. 23A and 23B are diagrammatic views illustrating one process of a feature extraction step of a method for extracting outer space feature information from spatial geometric data.
Figure 23B:
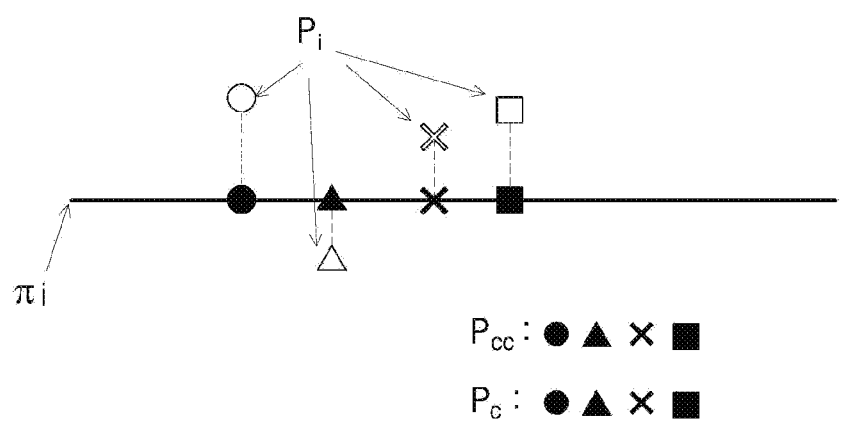

In the outer sample information calculation step S351, the control unit 20 sets a preset feature margin $d_{mrgc}$ (see FIGS. 23A and 23B) range around the convex hull information $conv(P_{\pi i})$, and determines the sampling plane information $P_{\pi i}$ present in the preset feature margin $d_{mrgc}$ range as outer sample information $P_{cc}$. In this case, the same value as that of the preset margin $d_{mrg}$ in the sampling step S20 may be used as the preset feature margin $d_{mrgc}$.

In the sample feature setting step S355, the control unit 20 sets spatial geometric data $P_i$ corresponding to the outer sample information $P_{cc}$ as a sample feature $P_c$.

The sample feature $P_c$ is stored as an outer space feature in the storage unit 30, and in this process the control unit 20 may determine whether or not the sample feature matches with previously extracted feature information to decide whether to update the feature information.

The sampling step and the feature extraction step can be performed repeatedly by a preset number of times. For example, as described above, if a plurality of sampling planes is formed in the step S20 after the sampling step and the feature extraction step are performed on one sample plane, the control unit 20 may count whether or not a predetermined process has been completed on all the corresponding sampling planes, and determine whether or not information on the plural sampling planes has been processed. If the plurality of sampling planes is collected for a plurality of preset origins, if necessary, the control unit 20 can determine whether or not the sampling step and the feature extraction step or the input step, the sampling step and the feature extraction step have been performed on the corresponding plural preset origins, and can repeatedly perform the steps or complete the performance of the steps.

In the meantime, in the above discussion, a description has been made centering on the simple relationship between planes for the sake of convenience of understanding, but outer information can be extracted in a more accurate and rapid manner using the characteristics of the present invention even in the case of a more complicated indoor space structure. That is, as shown in FIGS. 31 to 34, the indoor space structure can be exemplified by a space structure in which a depressed portion is present at the inside of the structure such as the inside of a dotted line X.

Figure 31:
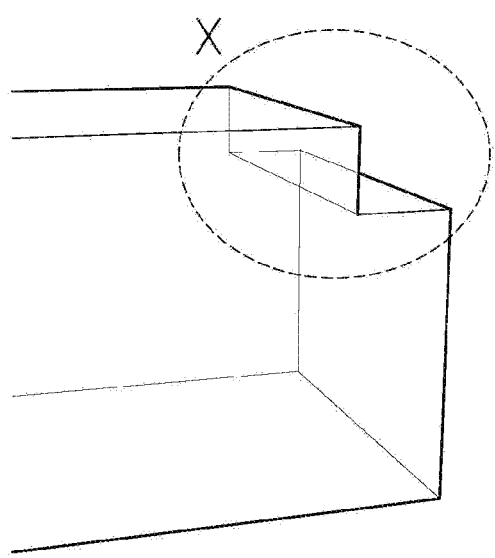
FIGS. 31, 32, 33 and 34 are diagrammatic views illustrating an outer feature information calculating process through a sampling plane for another type of indoor space structure in a method for extracting outer space feature information from spatial geometric data.
Figure 32:
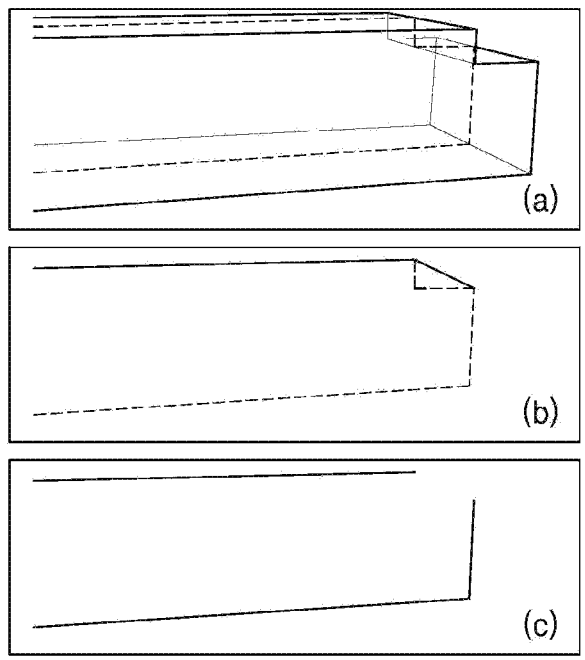
Figure 33:
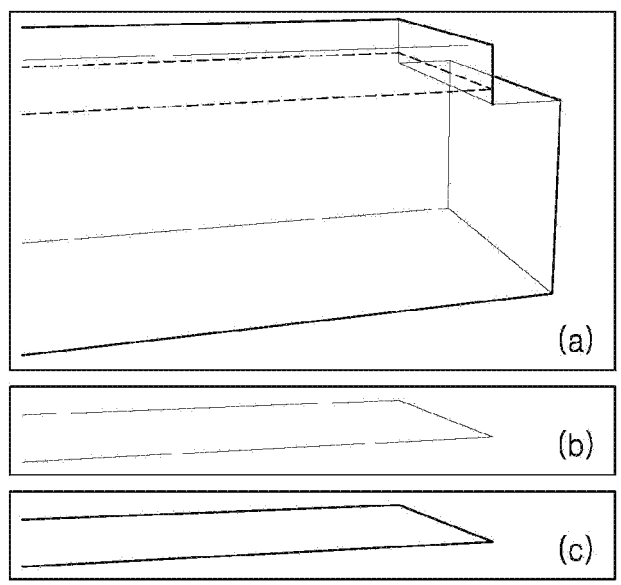
Figure 34:
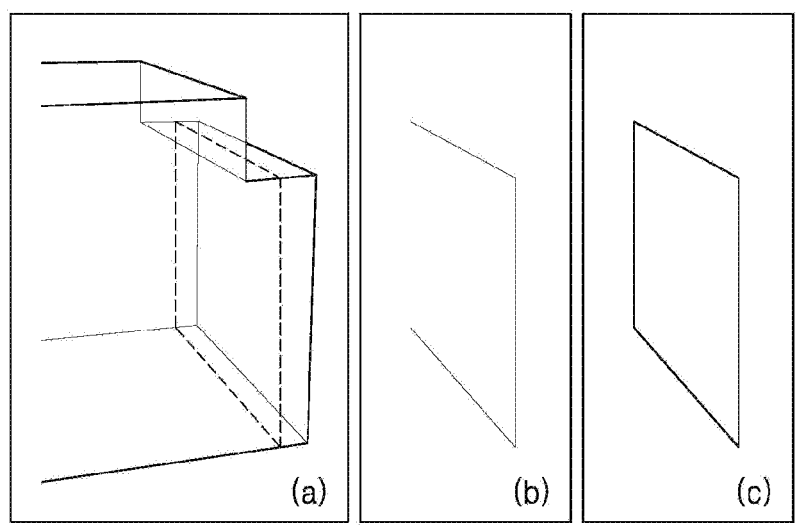

FIGS. 32A to 32C show an outer space feature extraction process for the indoor space structure shown in FIG. 31. As indicated by a dotted line in FIG. 32A, a crossing plane defining a crossing area with spatial geometric data constitutes a sampling plane $\pi_i$ parallel to a front surface PLNa. In this case, as shown in FIG. 32B, sampling plane information $P_{\pi i}$ for the sampling plane can be calculated, and sample convex hull information $conv(P_{\pi i})$ can be obtained through the calculated sampling plane information $P_{\pi i}$. As shown in FIG. 32C, when a sample feature $P_c$ is extracted, the depressed portion such as the inside of the dotted line of FIG. 31 is not included in the outer space feature information which is the sample feature.

On the other hand, in the case where the sampling plane $\pi_i$ is formed horizontally and vertically to conform to spatial geometric data as indicated by dotted lines shown in FIGS. 33A and 34A, the sampling plane information $P_{\pi i}$ for each sampling plane can be obtained and the sample convex hull information conv($P_{\pi i}$) can be obtained as shown FIGS. 33B and 34B. It can be seen that when the extraction of the sample feature $P_c$ as shown in FIGS. 33C and 34C is performed, the inside of the dotted line X of the indoor space structure of a shape like a stepped portion of FIG. 31 is included in the outer space feature information. As described above, it can be found that when various sampling planes are formed depending on the characteristics of the indoor space structure or the spatial geometric data input, the outer space feature information can be extracted more accurately.

The device for extracting outer space feature information from spatial geometric data and the method for extracting outer space feature information from spatial geometric data using the same are not limited to the formation of a map as described above, but can be utilized in a wide range of fields.

Figure 11:
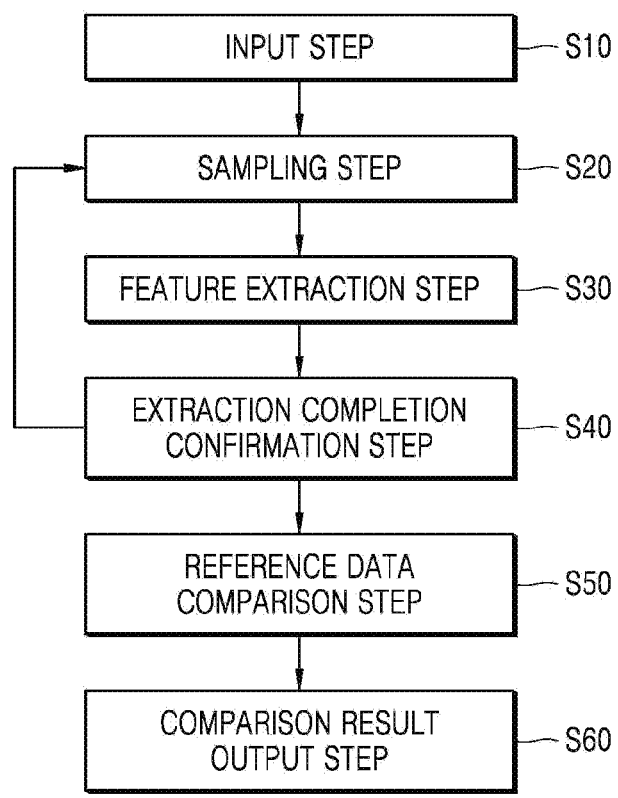
FIGS. 11 and 12 are flow charts illustrating another example of a method for extracting outer space feature information from spatial geometric data, which is used in a construction work.
Figure 12:
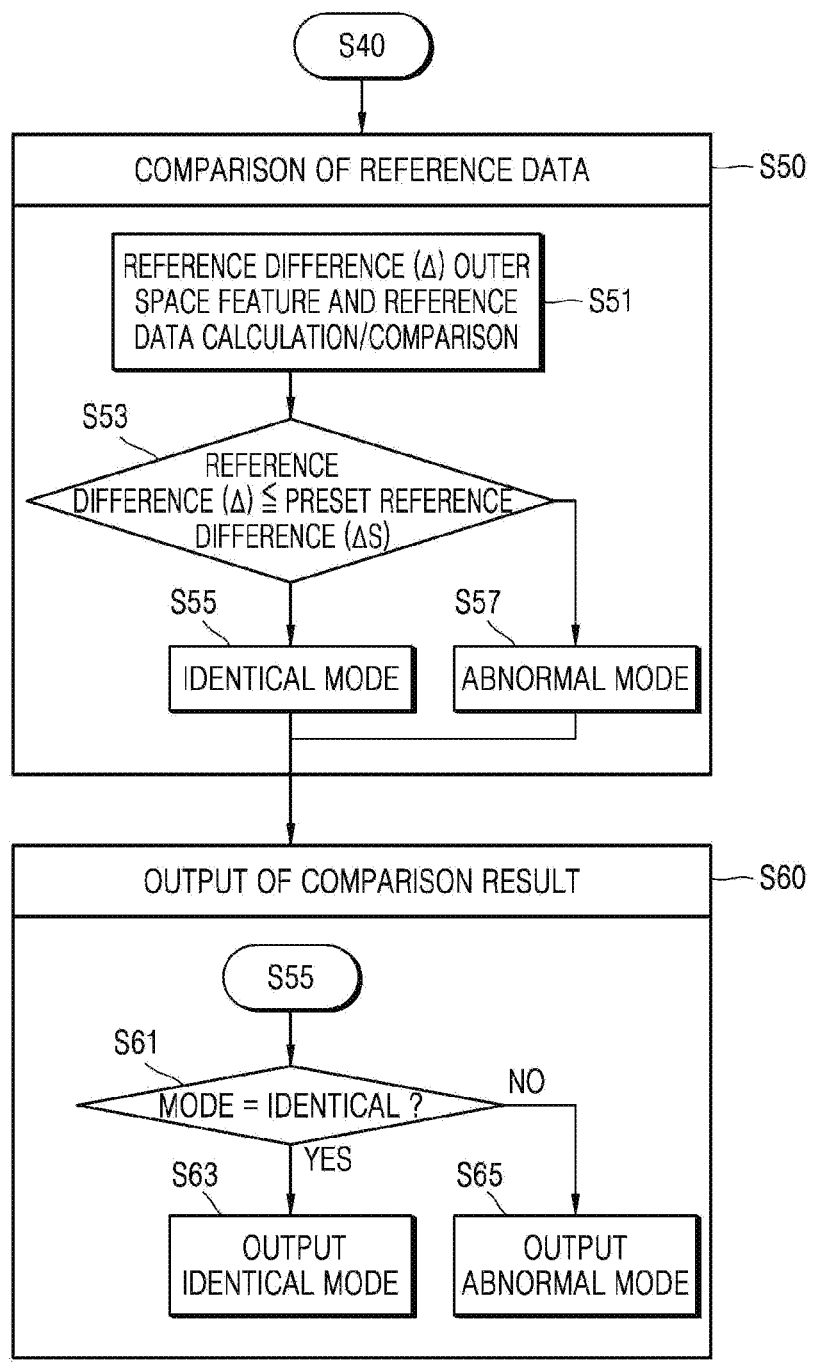
Figure 13:
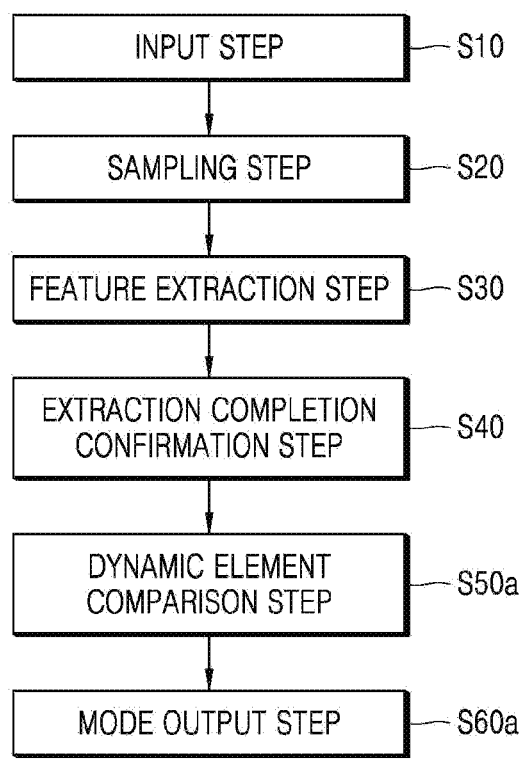
FIGS. 13 and 14 are flow charts illustrating still another example of a method for extracting outer space feature information from spatial geometric data, which is used in a security check.
Figure 14:
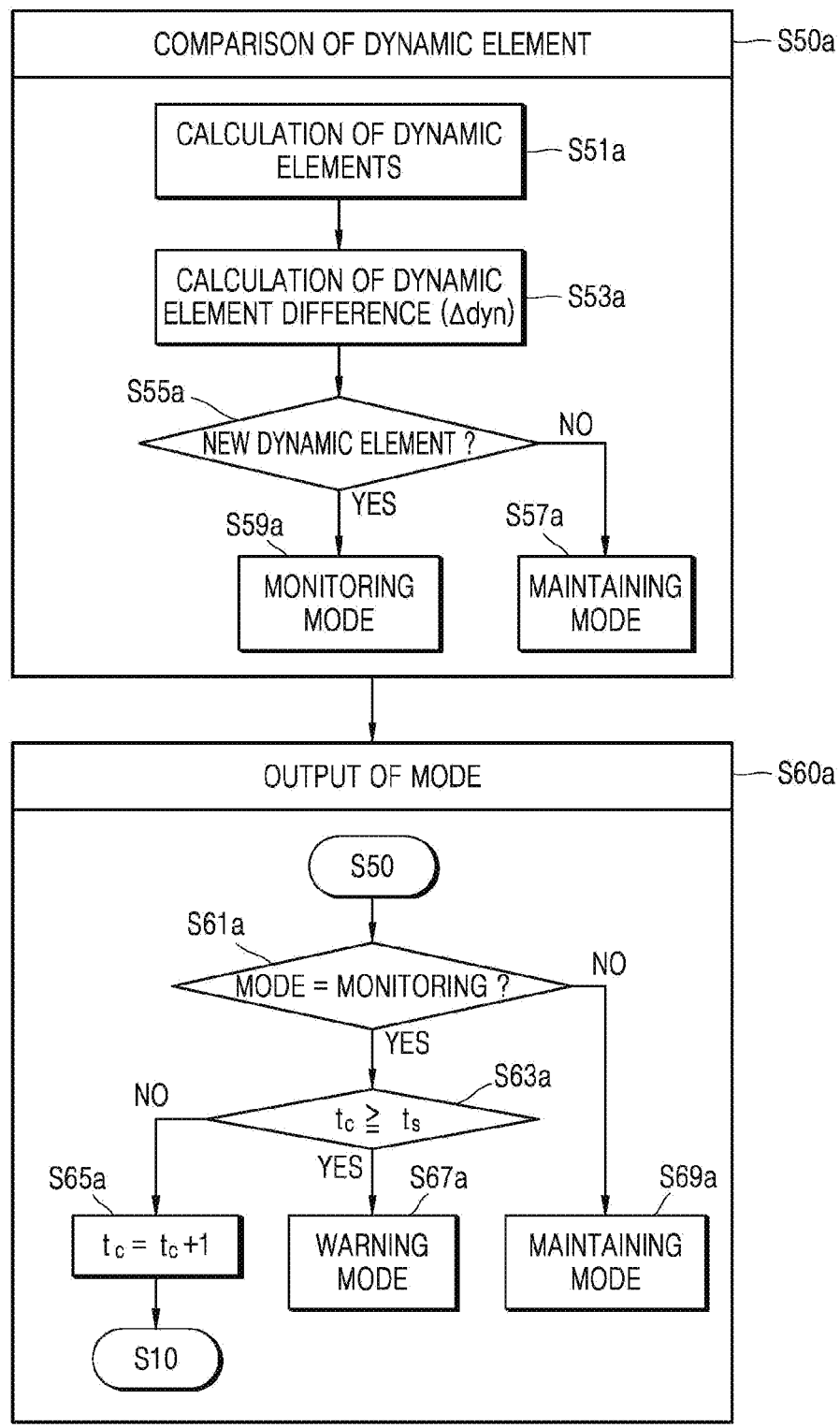
Figure 15:
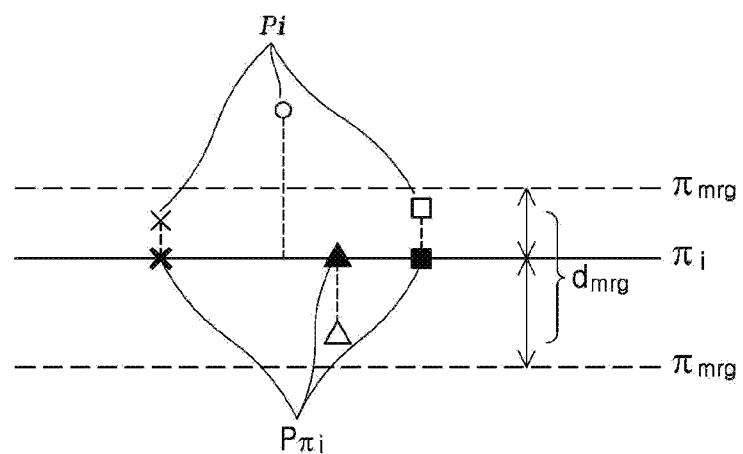
FIG. 15 is a diagrammatic view illustrating a projection process performed on a sampling plane in a method for extracting outer space feature information from spatial geometric data.
Figure 16:
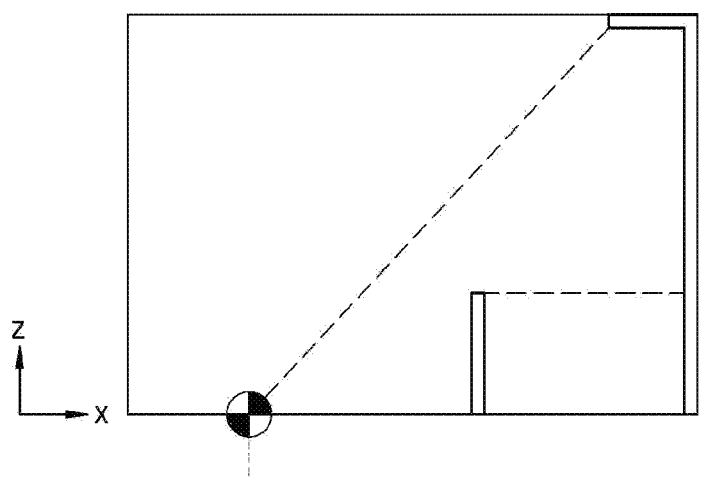
FIGS. 16 and 17 are diagrammatic views illustrating a feature extraction step of a method for extracting outer space feature information from spatial geometric data.

In another scenario, the device for extracting outer space feature information from spatial geometric data and the method for extracting outer space feature information from spatial geometric data using the same may be used in a concrete frame construction (see FIGS. 11 and 12). An interior finishing construction is carried out after a typical concrete frame construction. A concrete casting work is performed to carry out the interior finishing construction, a dimensional inspection is performed to determine whether or not an accurate finishing construction for a position fixing structure such as a wall and a floor defining an inner space is carried out, and a subsequent overlaying and chipping work is conducted depending on a finishing state. An individual measurement is performed using a measuring tape, a plummet, and the like in the dimensional inspection. However, in the case of using the device and method for extracting outer space feature information from spatial geometric data according to the present invention, a sensing unit such as LIDAR, i.e., a laser sensor senses a target region where the interior finishing construction is carried out so that the input step is performed to sense and input the spatial geometric data, and a predetermined sampling and feature extraction step is performed using a position of the sensing unit in the target region as a preset origin so as to extract outer feature information for the interior finishing work from the spatial geometric data of a target region (see FIG. 11, steps S10 to S40). Thus, a dynamic element such as a worker or a work tool or a non-outer element is excluded and the outer space feature information is used to extract a dimensional difference between a structural design standard and an actual to provide a warning indication for a region which is beyond a preset standard dimension or position information on the space which is beyond the preset standard dimension so that the worker can enhance the efficiency of a finishing or interior finishing work of a corresponding structure, for example, in the concrete frame construction in this scenario. In other words, after the completion of the step S40, the control unit 20 performs a reference data comparison step S50 and a comparison result output step S60. As used herein, the term "reference data" refers to a structural design standard, and may be input in the input step S10, and the like. In the reference data comparison step S50, the control unit 20 compares the outer space feature information with the reference data, compares a corresponding difference with a preset standard difference, and determines a mode to be performed. Then, the control unit 20 performs a predetermined output step depending on a corresponding determined mode in the comparison result output step S60.

The reference data comparison step S50 includes a reference difference calculation step S51, a reference difference comparison step S53, and an output mode determination steps S55 and S57.

In the reference difference calculation step S51, the control unit 20 compares the outer space feature information with the reference data, calculates a difference therebetween through the arithmetic unit 40, and forms this difference as a reference difference $\Delta$.

Thereafter, the control unit 20 performs the reference difference comparison step S53 of comparing the reference difference $\Delta$ with a preset reference difference $\Delta s$ included in the preset data of the storage unit 30. In the reference difference comparison step S53, if the reference difference $\Delta$ is equal to or smaller than the preset reference difference $\Delta s$, the control unit 20 determines that there is a slight difference between the outer space feature information and the reference data, and as a result, the outer space feature information and the reference data are substantially identical to each other, and then sets a mode to be performed in the output mode determination step as an identical mode (S55).

On the other hand, in the reference difference comparison step S53, if the reference difference $\Delta$ is larger than the preset reference difference $\Delta s$, the control unit 20 determines that there is a significant difference between the outer space feature information and the reference data, and as a result, the outer space feature information and the reference data are substantially different from each other, and then sets a mode to be performed in the output mode determination step as an abnormal mode (S57).

The reference difference comparison step may be performed on the entire outer space feature information, and may be partially performed on the outer space feature information. As such, various modifications are possible depending on the design specification.

After the output mode is set, the control unit 20 outputs the set mode as a comparison result through the output unit 60. In other words, the control unit 20 determines whether the performed mode is the identical mode (S61), and performs a corresponding mode of the identical mode and the abnormal mode based on a result of the comparison and outputs the corresponding mode through the output unit 60 which is implemented as a display. In the case of the abnormal mode, the control unit 20 displays both an abnormal region where the outer space feature information is difference from the reference data and a numerical error through the output unit 60 so that workability of the worker can be improved.

Figure 22:
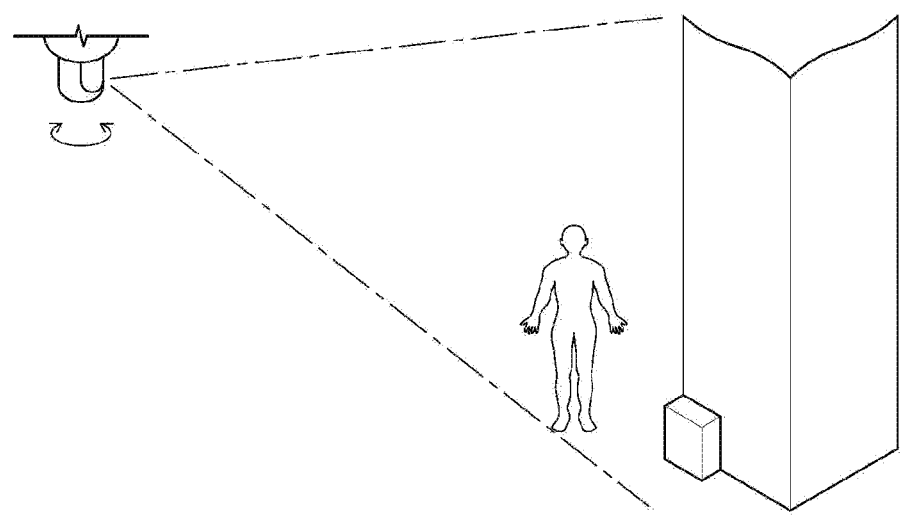
FIG. 22 is a schematic state view illustrating still another example of a method for extracting outer space feature information from spatial geometric data, which is used in a security check.

In addition, in another scenario, the device for extracting outer space feature information from spatial geometric data and the method for extracting outer space feature information from spatial geometric data using the same may be used in a reinforcing bar placing work. In the case of a concrete structure, a reinforcing bar placing work is performed using reinforcing bars in the structure, and then a concrete casting and curing process is performed on a formwork. If the position of and the interval between the placed reinforcing bars is not accurate, it is impossible to assemble the formwork or instability of the structure may be caused because the concrete casting work is performed in a state of having an error in a design structure. In order to prevent this, a given measurement process is performed after the reinforcing bar placing work and an error in the position and interval of the placed reinforcing bars found in the measurement process is subjected to a correction process. However, in the case where a conventional measurement process is performed, a reference point for a determination criterion of the measurement is absent or inaccurate in that placed reinforcing bars, particularly reinforcing bars constituting a column structure are is arranged in the air, which makes it difficult to accurately measure the position of the placed reinforcing bars. On the other hand, the use of the device for extracting outer space feature information from spatial geometric data and the method for extracting outer space feature information from spatial geometric data using the same can extract outer feature information as a floor portion of a corresponding constructional site through a convex cut using the sampling plane and the convex hull from spatial geometric data of the corresponding constructional site, which is sensed and input by the sensing unit capable of sensing three-dimensional depth information (see FIG. 22), and cancel the outer feature information as the flood portion of the corresponding constructional site from the input and sensed spatial geometric data so that the position information on the placed reinforcing bars can be confirmed, and an error value and erroneous position information can be confirmed through a comparison between design information and the spatial geometric data of the placed reinforcing bars. The depth information used in the convex cut uses only information on the inside of a region which is slightly longer than the floor of the reinforcing bars, if necessary, so that a structure of reducing the amount of calculation can be achieved in such a manner as to extract only outer feature information adjacent to a region where reinforcing bars are placed, but not the entire outer feature information. In addition, the sampling step using a two-dimensional plane may be again applied to only the three-dimensional reinforcing bars acquired in this manner to grasp the cross section of the reinforcing bars, and check the connection information of the reinforcing bars in consideration of the size and direction of the cross section of the reinforcing bars so that it is possible to rapidly and easily determine whether or not the reinforcing bars are placed properly.

Further, in the above scenarios, a description has been made centering on the case in which the present invention is applied to the construction work, but the method and device for extracting outer space feature information from spatial geometric data of the present invention may be utilized in a security service field. In other words, after the completion of the extraction of the outer space feature through a process including the steps S10 to S40, the control unit 20 performs a dynamic element comparison step S50a and a mode output step S60a. As used herein, the term "reference data" refers to a structural design standard, and may be input in the input step S10 and the like. In the dynamic element comparison step S50a, the control unit 20 extracts dynamic elements by excluding outer space feature information from the spatial geometric data (S51a). The control unit 20 compares the extracted dynamic elements with existing dynamic element information of a corresponding target region and calculates a dynamic element difference (Δdyn,t) based on a result of the comparison (S53a). The control unit 20 determines whether the calculated dynamic element difference is a new dynamic element (S55a), and sets a mode depending on a result of the determination (S57a, S59a). If the calculated dynamic element difference is a new dynamic element, the program proceeds to step S59a where the control unit 20 sets the operating mode as a monitoring mode. Contrarily, if the calculated dynamic element difference is not the new dynamic element, the program proceeds to step S57a where the control unit 20 sets the operating mode as a monitoring mode.

Thereafter, the control unit 20 determines whether the operating mode is the monitoring mode (S61a). If it is determined that the operating mode is NOT the monitoring mode, the control unit 20 performs the maintaining mode (S69a). On the other hand, if it is determined that the operating mode is the monitoring mode, the control unit 20 performs a monitoring counting comparison step S63a. The control unit 20 compares a monitoring counting number $t_c$ which is maintained as an object to be monitored with a preset counting number $t_s$ stored in the storage unit 30, and determines whether or not a new dynamic element is maintained in the monitoring counting comparison step S63a. If it is determined in step S63a that a predetermined time period has not lapsed, the program proceeds to step S65a where the control unit 20 increments a counting number and then proceeds to step S10 where a predetermined process is repeatedly performed. In this case, whether or not the dynamic element difference is a new dynamic element and the counting number incrementing step are performed by each section through a predetermined object recognition process so that a certain tag can be granted to perform the process by units. As such, various modifications are possible.

On the other hand, it is determined in step S63a that the predetermined time period has lapsed and a corresponding position is occupied, the program proceeds to step S67a where the control unit 20 can perform a warning mode S67a in which a corresponding new dynamic element is displayed to a user or a warning sound is output to the user to allow a security manager to implement a given security procedure.

In the above scenarios, mapping and various works in constructional sites are implemented. The method for extracting outer space feature information from spatial geometric data can be effectively applied to a wide range of fields.

Figure 24A:
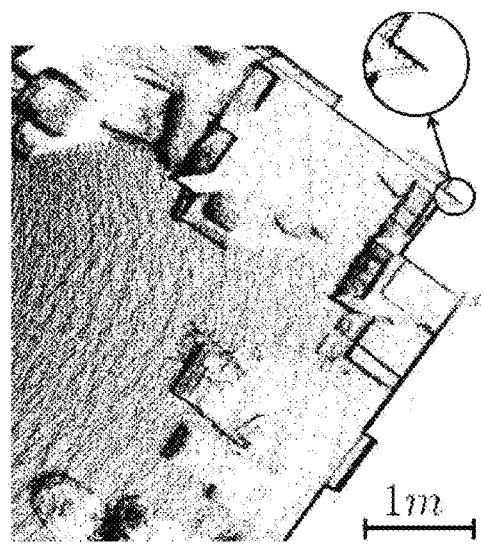
FIGS. 24A and 24B illustrate diagrammatic views of a result (a) for the case of using a conventional spatial data matching method and a result (b) for the case of using a convex hull of a method for extracting outer space feature information from spatial geometric data.
Figure 24B:
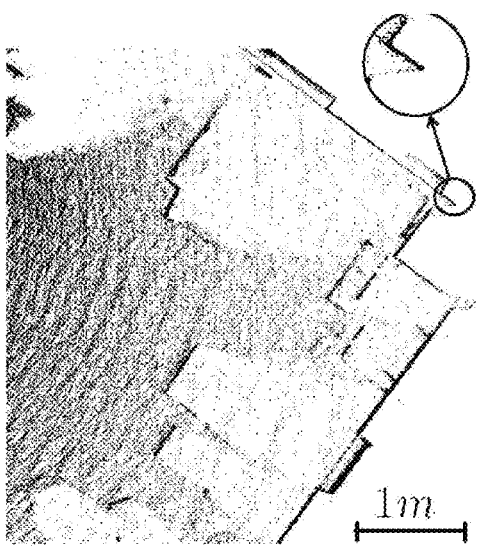

In other words, as a result obtained through the output unit of the present invention, a result including a structure as the static element, an object as the potentially dynamic element, or a dynamics as the dynamic element may be output. In the case of using only a feature present in the structure, the localization and mapping work is performed based on only the static feature which is not changed under any dynamic environment so that a constant result can always be obtained. In addition, utility of geometric features (e.g., planes, crossing points, crossing lines, or a protruded portion where discontinuity appears during differentiation performed in an arbitrary direction) or image features matched with the geometric features can be increased, and position prediction is possible which is strong against a noise as a result obtained by the output unit. That is, the structure has a tendency of representing a large portion constituting an indoor structure, and thus the position prediction can be performed which is stronger against the noise than in the case of using only feature points of the large portion and accuracy can be increased. FIGS. 24A and 24B show diagrammatic views of a result (a) for the case of using a conventional spatial data matching method and a result (b) for the case of using a convex hull of a method for extracting outer space feature information from spatial geometric data. The matching accuracy may be remarkably improved through the method for extracting outer space feature information from spatial geometric data.

Figure 25A:
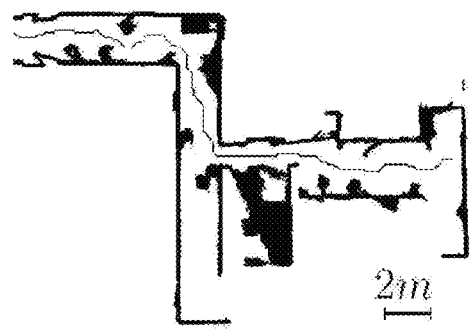
FIGS. 25A, 25B and 25C are diagrammatic views illustrating a path result (a) for the case of using a conventional simple motion planning of a mobile robot and a path result (b) of motion planning of a mobile robot for the case of using a convex hull of a method for extracting outer space feature information from spatial geometric data.
Figure 25B:
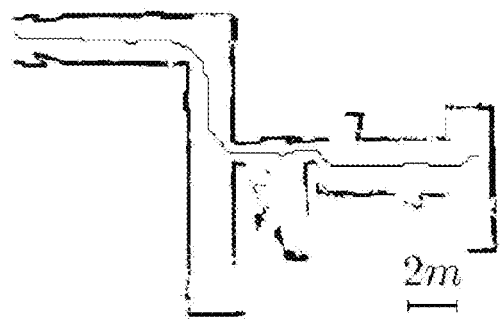
Figure 25C:
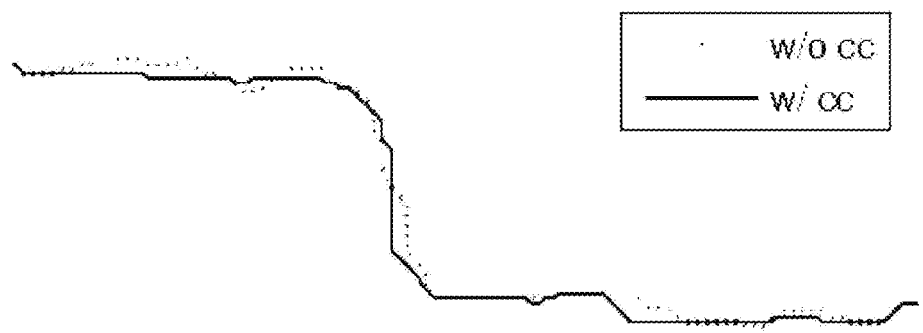

In addition, the structure as the static element constitutes a main entity such as a corridor, a hall or the like using derived data through the method for extracting outer space feature information from spatial geometric data, and thus it can be utilized in the traveling of a robot. FIGS. 25A to 25C diagrammatically show a path result (a) for the case of using a conventional simple motion planning of a mobile robot and a path result (b) of motion planning of a mobile robot for the case of using a convex hull of a method for extracting outer space feature information from spatial geometric data, and a path comparison (c) with the results. The more accurate and natural motion planning operation of a mobile robot can be implemented through the method for extracting outer space feature information from spatial geometric data.

Moreover, in the case where the data derived through the method for extracting outer space feature information from spatial geometric data is preprocessed as the structure or the object/dynamics, the amount of information to be calculated is reduced so that an effect of reducing the entire amount of calculation can be involved.

The above scenarios are merely examples for describing the present invention, and the present invention is not limited thereto but various modifications are possible.

While the present invention has been described in connection with the exemplary embodiments illustrated in the drawings, they are merely illustrative and the invention is not limited to these embodiments. It will be appreciated by a person having an ordinary skill in the art that various equivalent modifications and variations of the embodiments can be made without departing from the spirit and scope of the present invention. Therefore, the true technical scope of the present invention should be defined by the technical sprit of the appended claims.

What is claimed is:

1. A method for extracting outer space feature information of an indoor space structure from spatial geometric data, the method comprising:
    performing, by an electronic device, an input step of inputting spatial geometric data for a target region;
    performing, by an electronic device, a sampling step of determining a sample by selecting a crossing area where the spatial geometric data input in the input step and a crossing plane cross each other; and
    performing, by an electronic device, a feature extraction step of acquiring outer space feature information of the indoor space structure for a corresponding sampling plane using a convex hull method based on sampling information including sampling plane information of the spatial geometric data for a sampling plane selected in the sampling step;
    wherein the sampling plane is selected as the crossing plane defining the crossing area with the spatial geometric data.

2. The method according to claim 1, wherein the sampling step determines the sample by selecting the crossing area where the spatial geometric data and the crossing plane cross each other within a preset margin.

3. The method according to claim 2, wherein the sampling step comprises:
    a sampling plane determination step of selecting the sampling plane as the crossing plane defining the crossing area with the spatial geometric data; and
    a sample determination step of acquiring sampling plane information as the spatial geometric data that is present in the preset margin with respect to the sampling plane selected among the spatial geometric data.

4. The method according to claim 3, wherein in the sampling plane determination step, the sampling plane comprises a sampling plane formed at a predetermined angular interval (arbitrary three-dimensional angular interval) on a ground surface including a preset sampling origin which is positioned in the target region.

5. The method according to claim 4, wherein in the sampling plane determination step, the sampling plane is a plane including a vertical line segment perpendicular to the ground surface while passing through the preset sampling origin which is positioned in the target region, and is formed at a predetermined angular interval centering on the vertical line segment.

6. The method according to claim 4, wherein information on the preset sampling origin is position information at a time point of observation with respect to a sensing position of a sensing unit that acquires the spatial geometric data.

7. The method according to claim 6, wherein in the sampling plane determination step, the sampling plane comprises a sampling plane formed at the predetermined angular interval (arbitrary three-dimensional angular interval) on the ground surface including the position information at the time point of observation and the preset sampling origin which is positioned in the target region, and the position information at the time point of observation is arbitrary position information in the target region.

8. The method according to claim 6, wherein in the sampling plane determination step, the sampling plane is a plane including a vertical line segment perpendicular to the ground surface while passing through the position information at the time point of observation and the preset sampling origin, and comprises a sampling plane formed at a predetermined angular interval centering on the vertical line segment, and wherein the position information at the time point of observation is arbitrary position information in the target region.

9. The method according to claim 3, wherein the sample determination step comprises:
    a sample projection step of projecting the spatial geometric data that is present in the preset margin with respect to the sampling plane determined in the sampling plane determination step onto the sampling plane; and
    a sampling plane information confirmation step of setting the spatial geometric data projected onto the sampling plane in the sample projection step as the sampling plane information.

10. The method according to claim 1, wherein the feature extraction step comprises:
    a determined sample input step of specifically inputting sampling information in which the sample determined in the sampling step includes plane information;
    a sample convex hull execution step of calculating convex hull information by application of a convex hull based on the sampling information input in the determined sample input step; and
    a sample feature confirmation step of confirming a crossing portion in a preset range between the sampling information and the convex hull information to be a feature extracted for the sampling plane.

11. The method according to claim 10, wherein the sampling information comprises the sampling plane information and position information at a time point of observation, and the sample convex hull execution step applies the convex hull by including the position information at the time point of observation.

12. The method according to claim 11, wherein the sample feature confirmation step comprises:
    an outer sample information calculation step of calculating outer sample information by setting a preset feature margin range around the convex hull information; and
    a sample feature setting step of setting, as a sample feature, spatial geometric data corresponding to the outer sample information calculated in the outer sample information calculation step among the sampling plane information.

13. The method according to claim 1, further comprising:
a reference data comparison step of comparing the outer space feature information of indoor space structure with reference data which is input in the input step after the completion of the feature extraction step; and
a comparison result output step of outputting whether or not the outer space feature information of indoor space structure is identical to the reference data based on a result of the comparison in the reference data comparison step.

14. The method according to claim 1, further comprising:
a dynamic element comparison step of extracting dynamic elements using the outer space feature information of the indoor space structure and the spatial geometric data after the completion of the feature extraction step, comparing the extracted dynamic elements with existing dynamic element, and confirming whether or not a new dynamic element is present in the dynamic elements; and
a mode output step of performing a warning mode if the new dynamic element is maintained for more than a preset time period.

* * * * *